United States Patent [19]
Kinoshita

[11] Patent Number: 5,909,305
[45] Date of Patent: Jun. 1, 1999

[54] METHOD AND APPARATUS FOR MONITORING THE MOMENTAL WAVELENGTH OF LIGHT, AND AN OPTICAL AMPLIFIER AND AN OPTICAL COMMUNICATION SYSTEM WHICH INCORPORATE THE METHOD AND APPARATUS TO ADJUST GAIN TILT

[75] Inventor: Susumu Kinoshita, Kawasaki, Japan

[73] Assignee: Fujitsu Limited, Kawasaki, Japan

[21] Appl. No.: 09/069,147

[22] Filed: Apr. 29, 1998

Related U.S. Application Data

[62] Division of application No. 08/743,534, Nov. 4, 1996, Pat. No. 5,818,629.

[30] Foreign Application Priority Data

Dec. 7, 1995 [JP] Japan ................................. 7-319410

[51] Int. Cl.$^6$ .............................. G01J 3/28; H04B 10/08; H01S 3/00
[52] U.S. Cl. ........................ 359/341; 359/194; 359/337; 372/6
[58] Field of Search ..................................... 359/134, 160, 359/174, 194, 337, 341; 372/6

[56] References Cited

U.S. PATENT DOCUMENTS 5,721,635  2/1998  Shigematsu et al. .................... 359/341

FOREIGN PATENT DOCUMENTS 260710   9/1994  Japan .
9159526  6/1997  Japan .

*Primary Examiner*—Nelson Moskowitz
*Attorney, Agent, or Firm*—Staas & Halsey

[57] ABSTRACT

An apparatus which receives an input light having a spectrum, and determines a momental wavelength of the spectrum. The apparatus includes a decoupling unit, a weighting unit and a computation unit. The decoupling unit decouples a portion of the received input light, to provide a first signal representing the input light with the portion decoupled therefrom, and a second signal representing the decoupled portion. The weighting unit weights the second signal. The computation unit determines the momental wavelength from the power of the first signal and the power of the weighted second signal. An optical amplifier is also provided which determines the momental wavelength of an amplified light, and controls a gain tilt parameter of the optical amplifier in accordance with the determined momental wavelength, to reduce gain tilt. An optical communication system is also provided which includes a plurality of such optical amplifiers sequentially arranged along an optical transmission line.

24 Claims, 24 Drawing Sheets

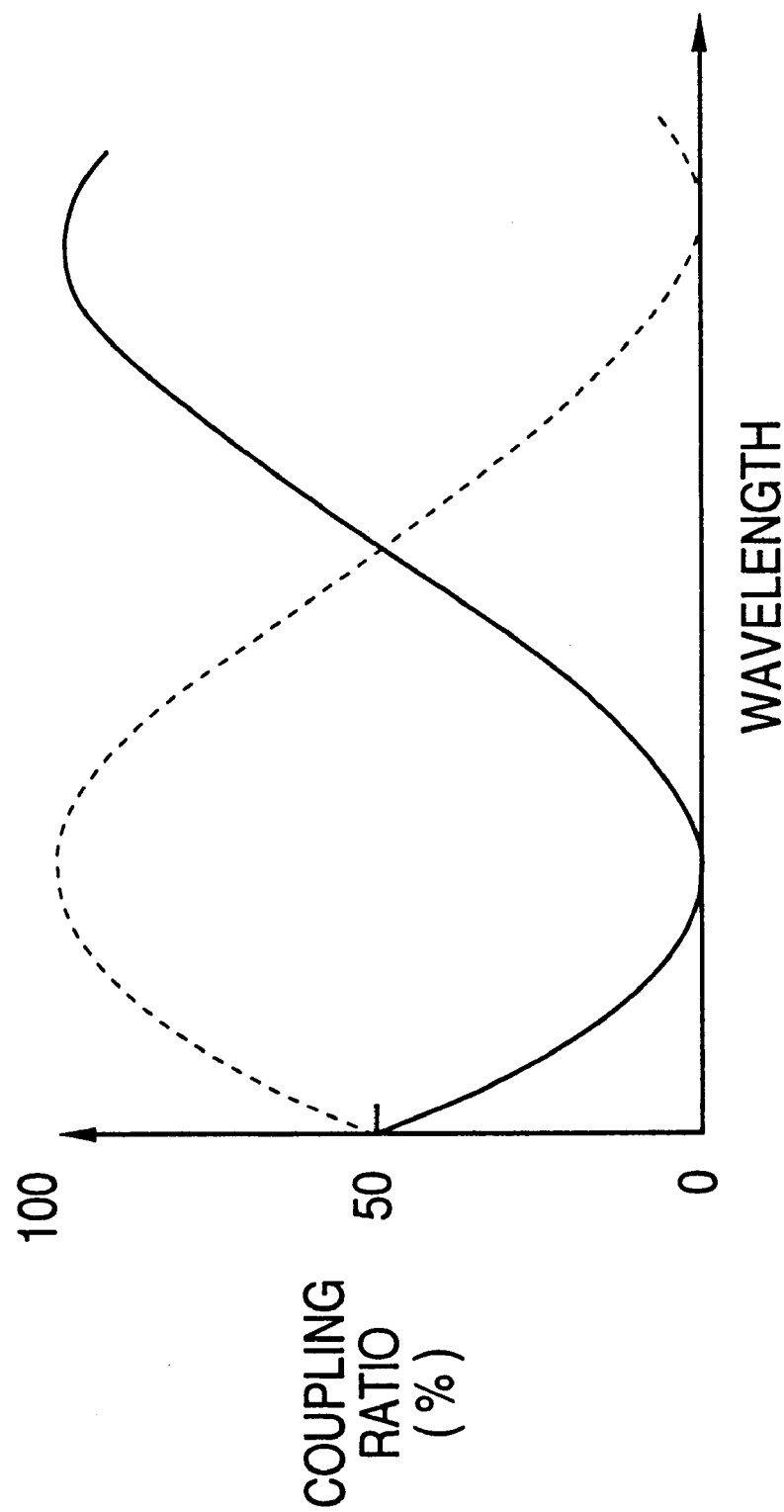

METHOD AND APPARATUS FOR MONITORING THE MOMENTAL WAVELENGTH OF LIGHT, AND AN OPTICAL AMPLIFIER AND AN OPTICAL COMMUNICATION SYSTEM WHICH INCORPORATE THE METHOD AND APPARATUS TO ADJUST GAIN TILT

CROSS-REFERENCE TO RELATED APPLICATIONS

This application is based on, and claims priority to Japanese patent application number 7-319410, filed on Dec. 7, 1995, in Japan, and which is incorporated herein by reference, and is a divisional of U.S. application Ser. No. 08/743,543 filed Nov. 4, 1996, and issued Oct. 6, 1998 as U.S. Pat. No. 5,818,629.

BACKGROUND OF THE INVENTION

1. Field of the Invention

The present invention relates to a method and apparatus for determining the momental wavelength of the spectrum of light. In addition, the present invention relates to an optical amplifier and an optical communication system which incorporate the method and apparatus to adjust gain tilt in accordance with the determined momental wavelength.

2. Description of the Related Art

Optical communication systems typically use wavelength-division multiplexing to increase transmission capacity. More specifically, a plurality of signal lights each having a different wavelength are multiplexed together into a wavelength division multiplexed (WDM) signal light. The WDM signal light is transmitted over a transmission line, and then demultiplexed at the other end of the transmission line so that the individual signal lights can be individually received. The transmission line is usually a single optical fiber.

An optical amplifier is typically used in such an optical communication system to amplify the WDM signal light, since an optical amplifier has a relatively broad band. More specifically, the broad band of the optical amplifier allows each of the individual signal lights in the WDM signal light to be amplified.

Generally, an optical amplifier includes an optical amplifying medium, such as an erbium-doped fiber (EDF). The WDM signal light travels through the optical amplifying medium. The optical amplifier also includes a light source, such as a laser diode, which provides pump light to the optical amplifying medium. The pump light causes the WDM signal light to be amplified as the light signal travels through the optical amplifying medium. Repeaters, each have an optical amplifier, are typically interposed into the transmission line to transmit a WDM signal light over a long distance.

Moreover, the gain of an optical amplifier is dependant on the wavelength of the amplified signal. This dependance is defined as the "gain tilt" of the optical amplifier. Therefore, when a WDM signal light is amplified by the optical amplifier, each of the individual signal lights multiplexed together may be amplified with a different gain. This gain tilt of the optical amplifier must be considered when using an optical amplifier to amplify a WDM signal light.

Therefore, the gain tilt of an optical amplifier should be monitored or controlled when using the optical amplifier in an optical communication system which used wavelength division multiplexing. A conventional spectrum analyzer can be used to monitor the gain tilt of an optical amplifier. However, a spectrum is expensive and relatively large device.

SUMMARY OF THE INVENTION

Accordingly, it is an object of the present invention to provide a method and apparatus for monitoring the gain tilt of an optical amplifier or for monitoring the spectrum of light, by determining a momental wavelength of the spectrum of the light.

Therefore, it is an object of the present invention to provide a method and apparatus determining a momental wavelength of the spectrum of light.

It is an additional object of the present invention to provide an optical amplifier which amplifies a light signal, determines the momental wavelength of amplified light, and controls the gain tilt of the optical amplifier in accordance with the determined momental wavelength.

It is a further object of the present invention to provide an optical communication system which monitors the momental wavelength of light transmitted through the optical communication system, and adjusts a parameter of the optical communication system in accordance with the monitored momental wavelength.

It is a still further object of the present invention to provide an optical communication which uses an optical amplifier which amplifies a light signal, determines the momental wavelength of amplified light, and controls the gain tilt of the optical amplifier in accordance with the determined momental wavelength.

Additional objects and advantages of the invention will be set forth in part in the description which follows, and, in part, will be obvious from the description, or may be learned by practice of the invention.

The foregoing objects of the present invention are achieved by providing an apparatus which receives an input light having a spectrum, and determines a momental wavelength of the spectrum. The apparatus includes a decoupling unit, a weighting unit and a it computation unit. The decoupling unit decouples a portion of the received input light, to provide a first signal representing the input light with the portion decoupled therefrom, and a second signal representing the decoupled portion. The weighting unit weights the second signal. The computation unit determines the momental wavelength from the power of the first signal and the power of the weighted second signal.

Objects of the present invention are also achieved by providing an apparatus which includes an amplifier unit and a gain tilt control unit. The amplifier unit receives an input light and amplifies the input light to produce an amplified light having a corresponding spectrum. The amplifier unit has a gain tilt and a parameter which is controllable to change the gain tilt. The gain tilt control unit determines a momental wavelength of the spectrum of the amplified light, and controls the gain tilt parameter in accordance with the determined momental wavelength to reduce the gain tilt.

Moreover, objects of the present invention are achieved by providing an apparatus which includes an amplifier unit and a gain tilt control unit. The amplifier unit receives and amplifies an input light and emits spontaneous emission during the amplification of the input light. The amplifier unit has a gain tilt and a parameter which is controllable to change the gain tilt. The gain tilt control unit determines a momental wavelength of the emitted spontaneous emission, and controls the gain tilt parameter in accordance with the determined momental wavelength to reduce the gain tilt.

Further, objects of the present invention are achieved by providing an optical communication system which includes an optical transmission line through which a wavelength division multiplexed (WDM) signal light travels in a propagation direction, and a plurality of optical amplifiers sequentially arranged along the optical transmission line in the propagation direction. Each optical amplifier includes an amplifier unit and a gain tilt control unit. The amplifier unit receives the WDM signal light from the optical transmission line as the WDM signal light travels along the optical transmission line to the respective optical amplifier, amplifies the received WDM signal light, and outputs the amplified WDM signal light to the optical transmission line so that the amplified WDM signal light travels along the optical transmission line in the propagation direction from the amplifier unit. The amplifier unit has a gain tilt and a parameter which is controllable to change the gain tilt. The gain tilt control unit determines a momental wavelength of the spectrum of the amplified WDM signal light output from the amplifier unit, and controls the gain tilt parameter in accordance with the determined momental wavelength to control the gain tilt of the amplifier unit.

BRIEF DESCRIPTION OF THE DRAWINGS

These and other objects and advantages of the invention will become apparent and more readily appreciated from the following description of the preferred embodiments, taken in conjunction with the accompanying drawings of which:

FIG. 15 is a graph illustrating characteristics of the weighting element illustrated in FIG. 14, according to an embodiment of the present invention.

DESCRIPTION OF THE PREFERRED EMBODIMENTS

Figure 1:
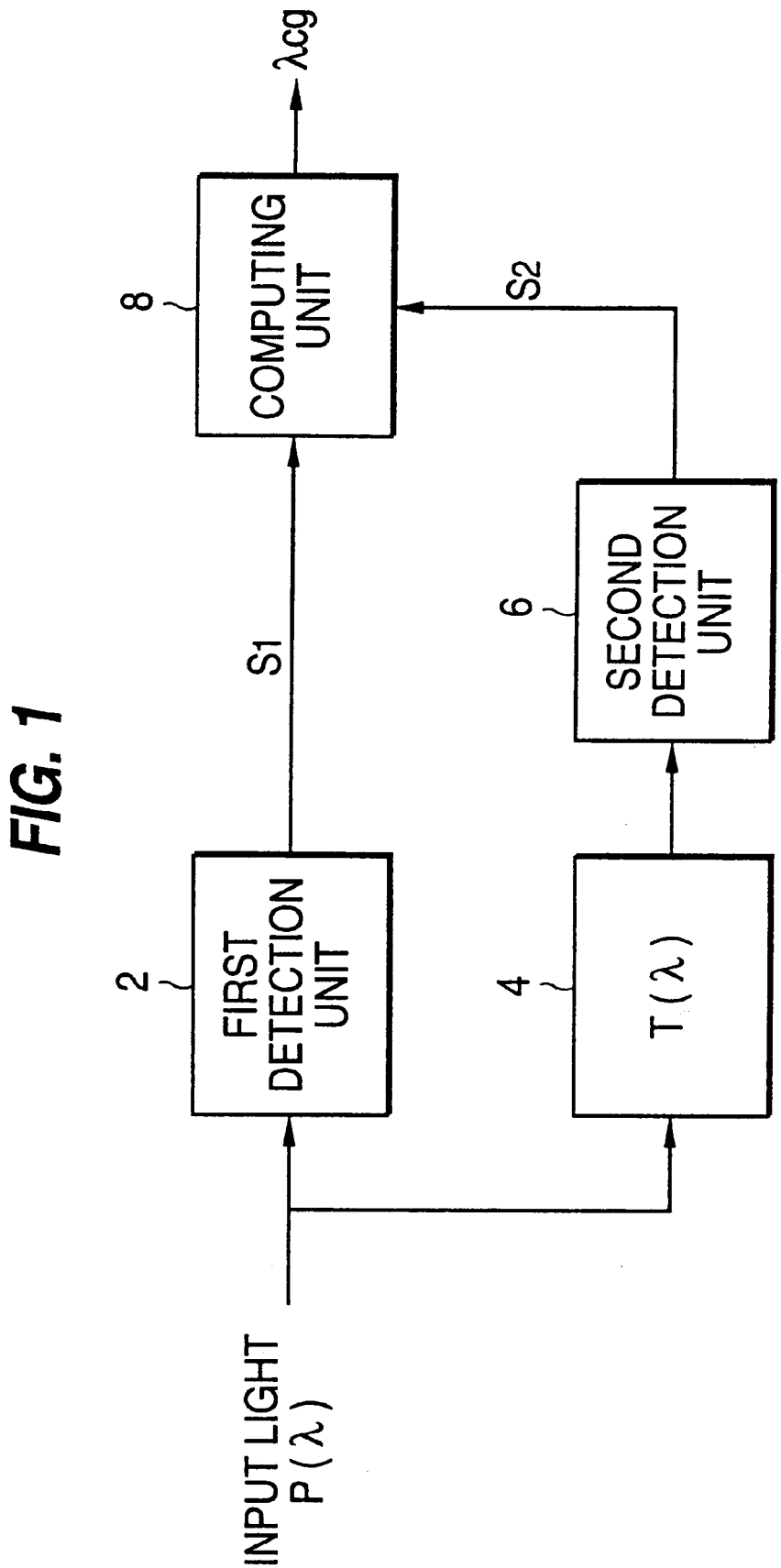
FIG. 1 is a diagram illustrating a monitoring device for monitoring a momental wavelength of input light, according to an embodiment of the present invention.

Reference will now be made in detail to the present preferred embodiments of the present invention, examples of which are illustrated in the accompanying drawings, wherein like reference numerals refer to like elements throughout.

FIG. 1 is a diagram illustrating a monitoring device for monitoring a momental wavelength of input light, according to an embodiment of the present invention. Referring now to FIG. 1, input light has a spectrum represented by $P(\lambda)$ in a given band. The input light is provided to a first detection unit 2 which detects a first value $S_1$ corresponding to the total power of input light. All or part of the input light is provided to a weighting unit 4 weights the received light with a weighting function $T(\lambda)$ approximated by a linear function of wavelength $\lambda$. A second detection unit 6 detects a second value $S_2$ corresponding to the power of weighted light output from weighting unit 4. A computing unit 8 receives the first value $S_1$ and the second value $S_2$ and calculates a momental wavelength $\lambda_{cg}$ of the input light from the received first and second values $S_1$ and $S_2$.

Figure 2:
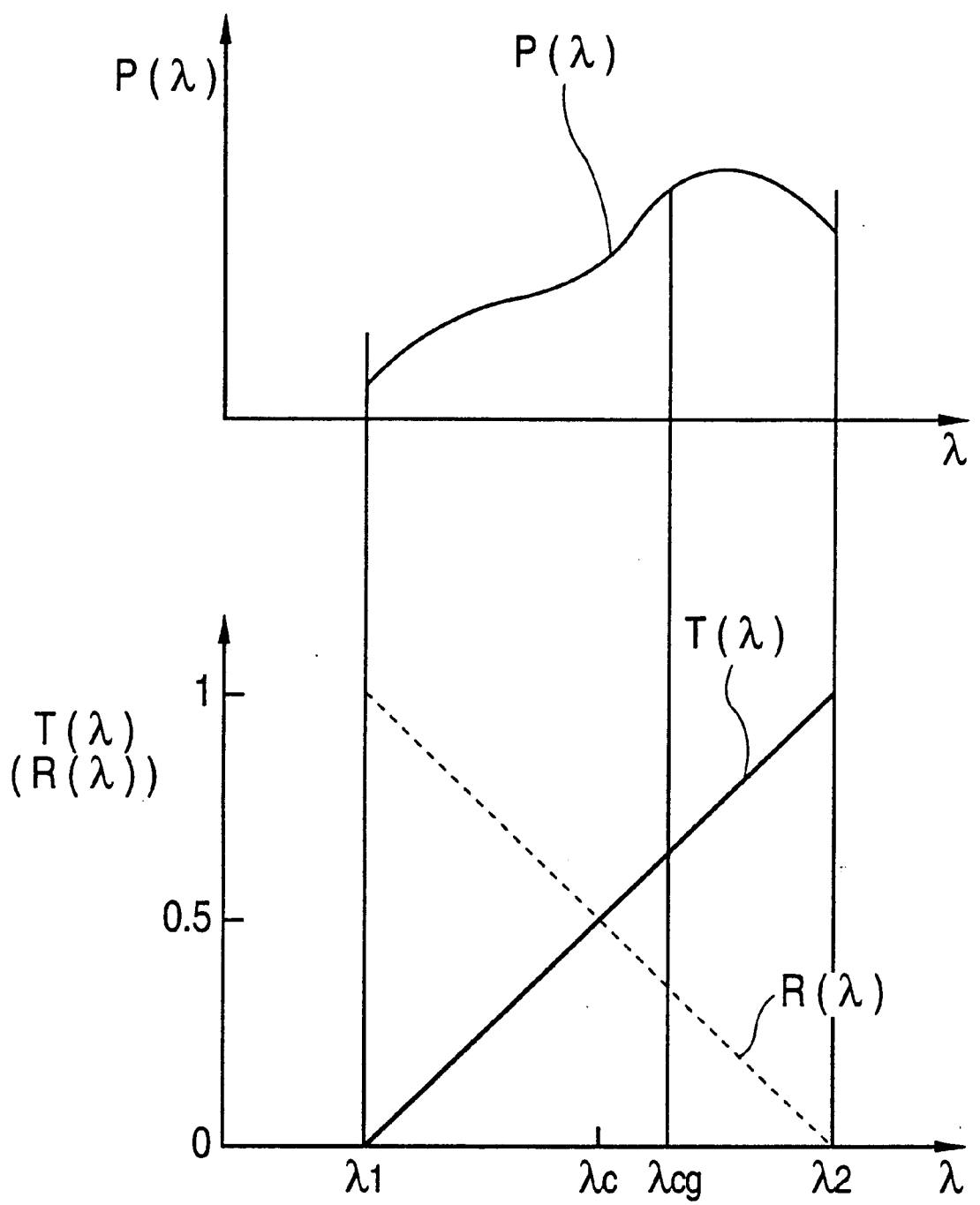
FIG. 2 is a graph illustrating principles of momental wavelength, according to embodiments of the present invention.

FIG. 2 is a graph illustrating principles of momental wavelength, according to embodiments of the present invention. More specifically, FIG. 2 illustrates the principle of monitoring of the momental wavelength $\lambda_{cg}$ in the monitoring device illustrated in FIG. 1. As previously described, the input light has a spectrum represented by $P(\lambda)$ in a given band. $\lambda_1$ and $\lambda_2$ represent a shortest wavelength and a longest wavelength in the band, respectively, and $\lambda_c$ represents a center wavelength in the band. To simply understanding of the principle of monitoring the momental wavelength $\lambda_{cg}$, it is assumed that the weighting function $T(\lambda)$ is a linear function of wavelength $\lambda$, $T(\lambda_1)=0$, and $T(\lambda_2)=1$. That is, the weighting function $T(\lambda)$ is given by the following Equation (1).

Equation (1):

$$T(\lambda) = \frac{1}{\lambda_2 - \lambda_1}\lambda - \frac{\lambda_1}{\lambda_2 - \lambda_1}$$

In the case that the band where the spectrum of the input light exists is given, the momental wavelength $\lambda_{cg}$ is defined by the following Equation (2).

Equation (2):

$$\lambda_{cg} = \frac{\int_{\lambda_1}^{\lambda_2} \lambda P(\lambda)d\lambda}{\int_{\lambda_1}^{\lambda_2} \lambda P(\lambda)d\lambda}$$

The momental wavelength $\lambda_{cg}$ is geometrically defined as a wavelength at which the area determined by the spectrum $P(\lambda)$ in a given band is divided into two equal values.

The first value $S_1$ and the second value $S_2$ detected in FIG. 1 satisfy the following Equations (3) and (4).

Equation (3):

$$S_1 \propto \int_{\lambda_1}^{\lambda_2} P(\lambda)d\lambda$$

Equation (4):

$$S_2 \propto \int_{\lambda_1}^{\lambda_2} T(\lambda)P(\lambda)d\lambda$$

By inserting Equation (1) into Equation (4) and considering Equation (2), $S_2/S_1$ is given by the following Equation (5).

Equation (5):

$$\frac{S_2}{S_1} \propto \frac{1}{\lambda_2 - \lambda_1}\lambda_{cg} - \frac{\lambda_1}{\lambda_2 - \lambda_1}$$

Particularly, in the case that a half of the input light is supplied to first detecting unit 2, the other half is supplied to weighting unit 4, and a loss in weighting unit 4 is negligible in FIG. 1, the left side and the right side of Equation (5) are equal to each other. In this case, the momental wavelength $\lambda_{cg}$ is given by the following Equation (6).

Equation (6):

$$\lambda_{cg} = (\lambda_2 - \lambda_1)\frac{S_2}{S_1} + \lambda_1$$

Thus, by using a specific weighting function or a function approximated thereto, the momental wavelength $\lambda_{cg}$ can easily be calculated according to the ratio $S_2/S_1$ between the second value S2 and the first value S1.

A broken line illustrated in FIG. 2 denotes a different weighting function defined as $R(\lambda)=1-T(\lambda)$. The momental wavelength $\lambda_{cg}$ can also be easily obtained by using the weighting function $R(\lambda)$. Effective use of combination of the weighting functions $T(\lambda)$ and $R(\lambda)$ will be hereinafter described.

Figure 3:
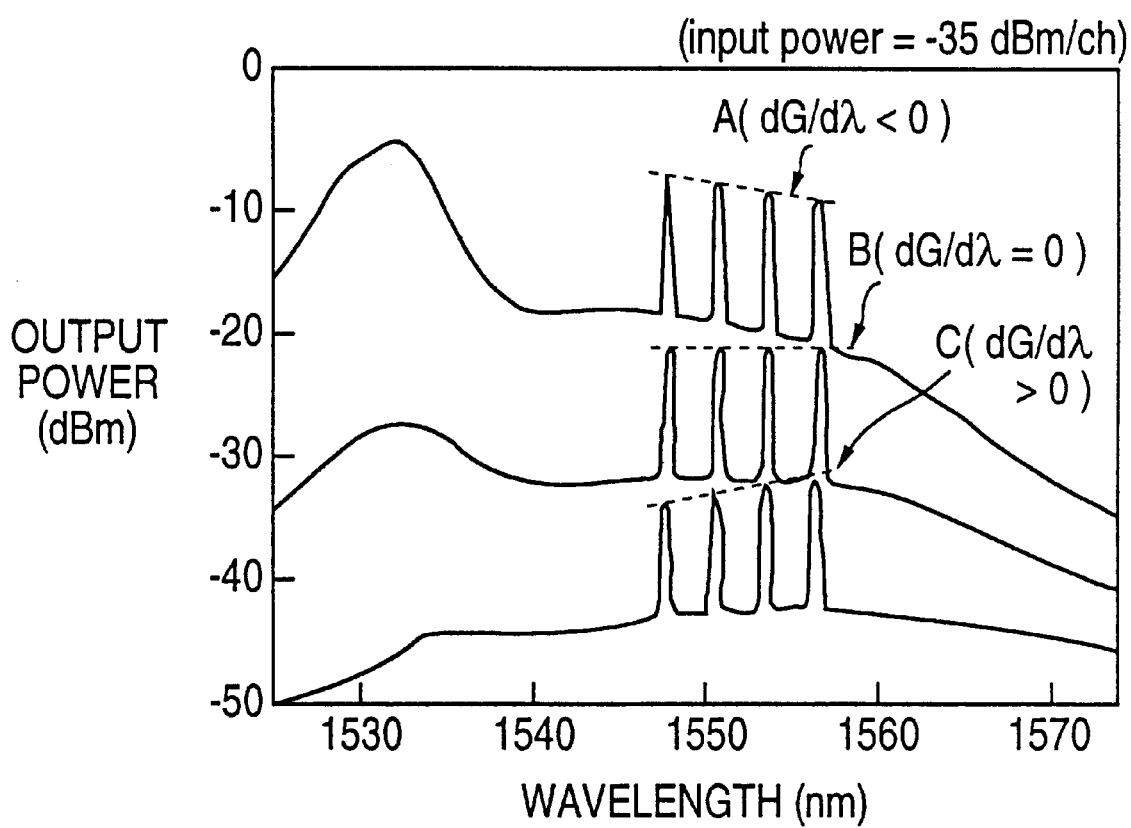
FIG. 3 is a diagram illustrating gain tilt of an optical amplifier, according to embodiments of the present invention.

FIG. 3 is a diagram illustrating gain tilt of an erbium doped fiber amplifier (EDFA), according to embodiments of the present invention. More specifically, FIG. 3 illustrates the spectra of output light when WDM light signals on four channels of wavelengths of 1548, 1551, 1554, and 1557 nm are input into a pumped EDF (erbium-doped fiber) with the same input power (−35 dBm/ch). In FIG. 3, the vertical axis represents output power (dBm) and the horizontal axis represents wavelength (nm). The spectrum denoted by "A" corresponds to the case where the power of pump light is relatively large. In this case, negative gain tilt is obtained. That is, the differential of gain with respect to wavelength is negative ($dG/d\lambda<0$). The spectrum denoted by "C" corresponds to the case where the power of pump light is relatively small. In this case, positive gain tilt is obtained. That is, the differential of gain with respect to wavelength is positive ($dG/d\lambda>0$). The spectrum denoted by "B" corresponds to the case where the power of pump light is optimum with no gain tilt. That is, the differential of gain with respect to wavelength is zero ($dG/d\lambda=0$). Each spectrum has a shape such that four sharp spectra corresponding to light signals on the four channels are superimposed on the spectrum of amplified spontaneous emission (ASE) light.

In an optical amplifier, gain characteristics for a small signal are reflected on the spectrum of ASE light. It is now assumed that the ASE light includes spontaneous emission (SE) light. Accordingly, the gain tilt in an optical amplifier can be determined by monitoring the momental wavelength of the spectrum of ASE light in a given band. Also, for the spectrum obtained by superimposing the spectra of WDM light signals on the spectrum of ASE light as shown in FIG. 3, the monitoring of the momental wavelength of this spectrum provides useful information on characteristics of the optical amplifier.

Figure 4A:
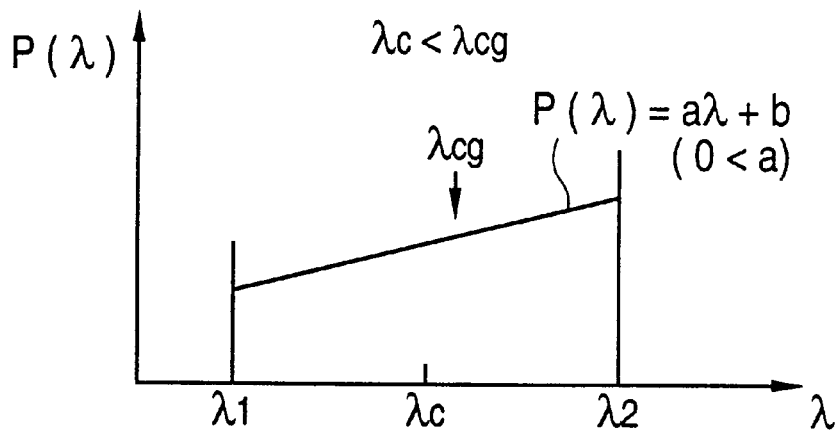
FIGS. 4A, 4B, and 4C are graphs illustrating examples of the momental wavelength of amplified spontaneous emission (ASE) light for different spectrums, according to an embodiment of the present invention.
Figure 4B:
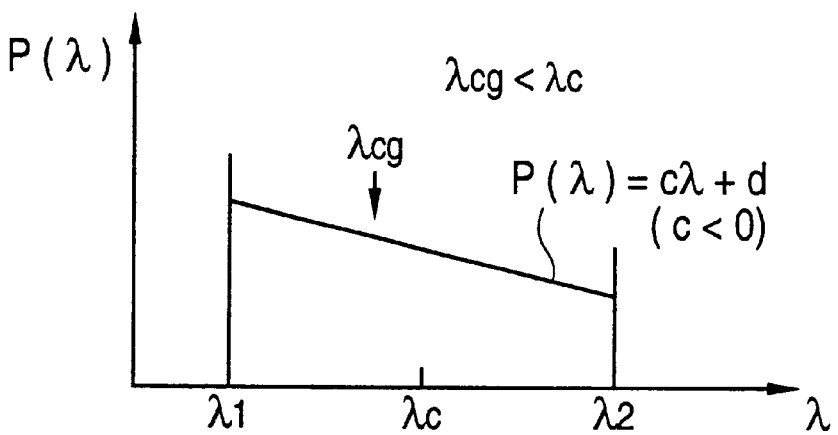
Figure 4C:
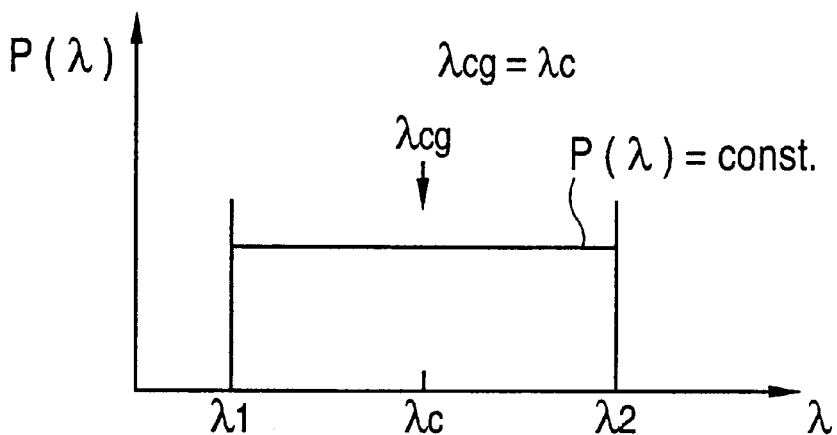

FIGS. 4A, 4B, and 4C are graphs illustrating examples of the momental wavelength of amplified spontaneous emission (ASE) light for different spectrums, according to an embodiment of the present invention. FIG. 4A illustrates a case where the spectrum $P(\lambda)$ of ASE light in a given band is represented by $P(\lambda)=a\lambda+b$ (0<a). In this case, the spectrum is inclined upward to the right with respect to the wavelength axis, so that the momental wavelength $\lambda_{cg}$ is longer than the center wavelength $\lambda_c$ in the given band.

FIG. 4B illustrates a case where the spectrum $P(\lambda)$ of ASE light in a given band is represented by $P(\lambda)=c\lambda+d$ (c<0). In this case, the spectrum is inclined downward to the right with respect to the wavelength axis, so that the momental wavelength $\lambda_{cg}$ is shorter than the center wavelength $\lambda_c$.

FIG. 4C illustrates a case where the spectrum $P(\lambda)$ of ASE light in a given band is flat. In this case, the momental wavelength $\lambda_{cg}$ is equal to the center wavelength $\lambda_c$.

Thus, the tendency of inclination of the spectrum in a given band is reflected on the momental wavelength. Therefore, required characteristics of an optical amplifier can be obtained by controlling a parameter, such as the power of pump light on which the gain tilt characteristic depends, according to a monitored value of momental wavelength. The details of such control will be hereinafter described.

When the spectrum of each light signal, or "channel", multiplexed into a WDM signal light is approximated by a line spectrum, the wavelength on each channel has a discrete value, so that the momental wavelength $\lambda_{cg}$ can be simply expressed as in the following Equation (7).

Equation (7):

$$\lambda_{cg} = \frac{\Sigma \lambda P(\lambda)}{\Sigma P(\lambda)}$$

Figure 5A:
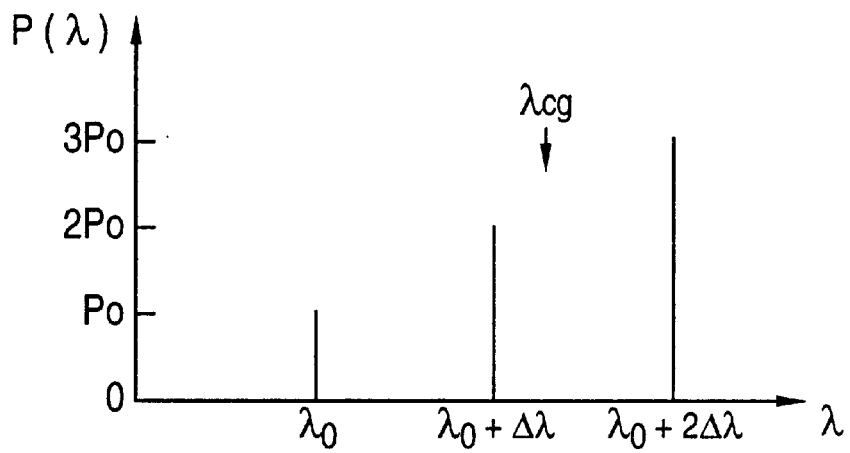
FIGS. 5A, 5B, and 5C are graphs illustrating examples of the momental wavelength for WDM signal light, according to an embodiment of the present invention.
Figure 5B:
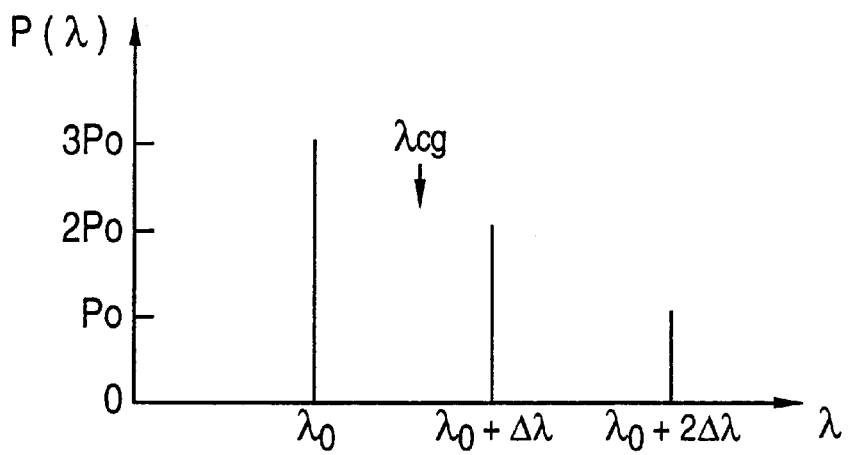
Figure 5C:
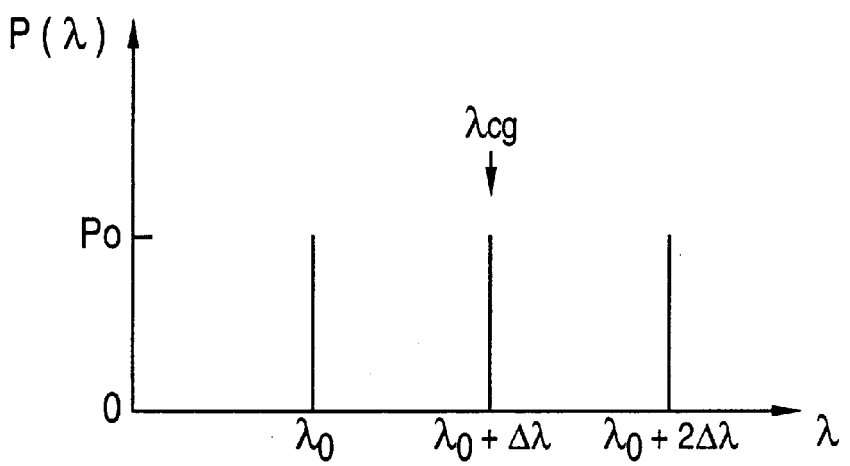

FIGS. 5A, 5B, and 5C are graphs illustrating examples of the momental wavelength for WDM signal light, according to an embodiment of the present invention. More specifically, FIG. 5A is a graph showing the discrete spectra of WDM light signals on three channels arranged at equal intervals along the wavelength axis. The wavelengths on the first, second, and third channels are represented by $\lambda_0$, $\lambda_0+\Delta\lambda$, and $\lambda_0+2\Delta\lambda$, respectively, and the magnitudes P($\lambda$) of the spectra on the first, second, and third channels are $P_0$, $2P_0$, and $3P_0$, respectively. In this case, the momental wavelength $\lambda_{cg}$ is given as $\lambda_{cg}=\lambda_0+4\Delta\lambda/3$ from Equation (7).

FIG. 5B illustrates a case where the magnitudes P($\lambda$) on the first, second, and third channels are $3P_0$, $2P_0$, and $P_0$, respectively. In this case, the momental wavelength $\lambda_{cg}$ is given as $\lambda_{cg}=\lambda_0+2\Delta\lambda/3$.

FIG. 5C illustrates a case where the magnitudes P($\lambda$) on the first, second, and third channels are all $P_0$. In this case, the momental wavelength $\lambda_{cg}$ becomes equal to the wavelength on the second channel. That is, $\lambda_{cg}=\lambda_0+\Delta\lambda$.

Thus, when discrete spectra are given, the momental wavelength in the set of the discrete spectra can be easily obtained. This is due to the fact that the momental wavelength in the set of the discrete spectra is determined by the location and magnitude of each spectrum. Conversely, when the magnitude of each spectrum is known, information on a missing channel or channels can be obtained according to the monitor value of momental wavelength.

Figure 6:
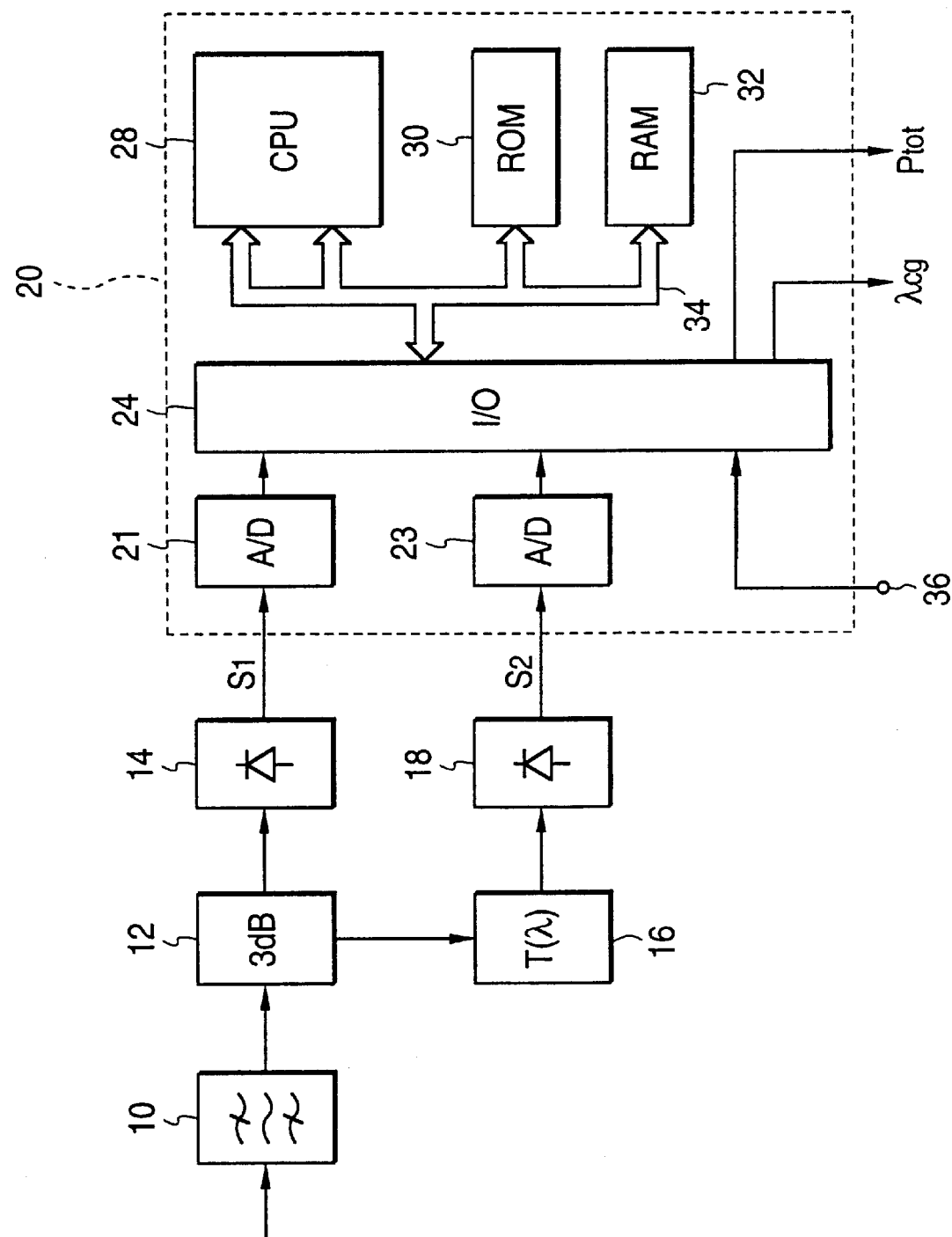
FIG. 6 is a diagram illustrating a monitoring device for monitoring momental wavelength, according to an embodiment of the present invention.

FIG. 6 is a diagram illustrating a monitoring device for monitoring momental wavelength, according to an embodiment of the present invention. Referring now to FIG. 6, an optical band-pass filter 10 limits the band of input light. Filter 10 has a pass band with a shortest wavelength and longest wavelength corresponding, respectively, to the wavelength $\lambda_1$ and the wavelength $\lambda_2$ shown in FIG. 2. Light passed through filter 10 is branched into a first branch light beam and a second branch light beam by an optical coupler 12. The first branch light beam is supplied to a photodetector 14 which outputs an electrical signal corresponding to the first value $S_1$. The second branch light beam is supplied through a weighting element 16. Weighting element 16 weights the second branch light beam and outputs the weighted second branch light beam to a photodetector 18. Photodetector 18 outputs an electrical signal corresponding to the second value $S_2$. In the case that an insertion loss of weighting element 16 is negligible, optical coupler 12 is designed so that the powers of the first and second branch light beams become equal to each other. That is, in this case, optical coupler 12 is a 3-dB coupler. When an insertion loss of weighting element 16 is not negligible, the branching ratio in optical coupler 12 is adjusted to compensate for the insertion loss. Also, when the light sensitivities of photodetectors 14 and 18 are different from each other, the difference in sensitivity between photodetectors 14 and 18 can be compensated for by adjusting the branching ratio in optical coupler 12. Alternatively, the above-described compensations may be balanced by individually adjusting or offsetting the electrical signals output from photodetectors 14 and 16, rather than by adjusting the branching ratio.

The output signals from photodetectors 14 and 18 are supplied to a computing unit 20 for calculate a momental wavelength and perform control according to the calculated momental wavelength. Computing unit 20 includes A/D converters 21 and 23 for converting the analog output signals from photodetectors 14 and 18, respectively, into digital signals. Computing unit 20 also includes an I/O port 24 for receiving digital data from A/D converts 21 and 23, a CPU 28 for computing according to predetermined programs, a read-only memory (ROM) 30 for preliminarily storing the programs and data tables for computation, and a random access memory (RAM) 32 for temporarily storing the results of calculation. I/O port 24, CPU 28, ROM 30, and RAM 32 are mutually connected by a data bus 34. A control input terminal 36 is connected to I/O port 24 to input a target value of momental wavelength. Control input terminal 36 can also be used to input supervisory information when the monitoring device is used for control in an optical amplifier (discussed in more detail below).

Figure 7:
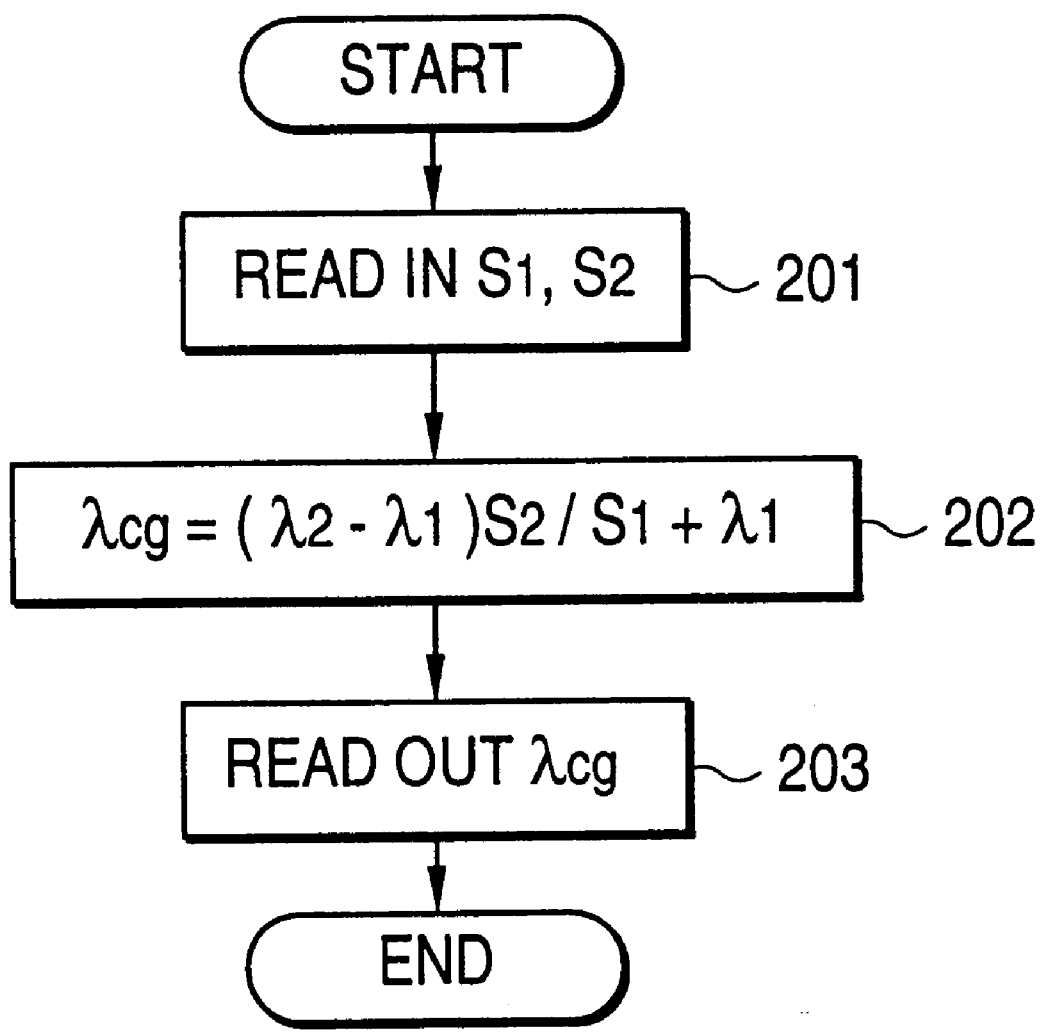
FIG. 7 is a flowchart illustrating the operation of the monitoring device illustrated in FIG. 6, according to an embodiment of the present invention.

FIG. 7 is a flowchart illustrating the operation of the monitoring device illustrated in FIG. 6, according to an embodiment of the present invention. Here, it is assumed that weighting element 16 has substantially the weighting function T($\lambda$) shown in FIG. 2.

First, in step 201, the first value SI and the second value $S_2$ are read, according to the signals from photodetectors 14 and 18. From step 201, the process moves to step 202, where a momental wavelength $\lambda_{cg}$ is calculated from Equation (6), in which $\lambda_1$ and $\lambda_2$ are those shown in FIG. 2, or they are cut-off wavelengths (the shortest wavelength and the longest wavelength in the pass band) of optical band-pass filter 10 (see FIG. 6). From step 202, the process moves to step 203, where the calculated momental wavelength $\lambda_{cg}$ is read out. In the case that the control according to a monitor value of momental wavelength is performed, step 203 is replaced by a control flow.

The total power $P_{tot}$ of input light supplied to the monitoring device shown in FIG. 6 corresponds to the output signal from photodetector 14. Therefore, a monitor value of the total power $P_{tot}$ to may be read out according to the first value $S_1$.

Figure 8:
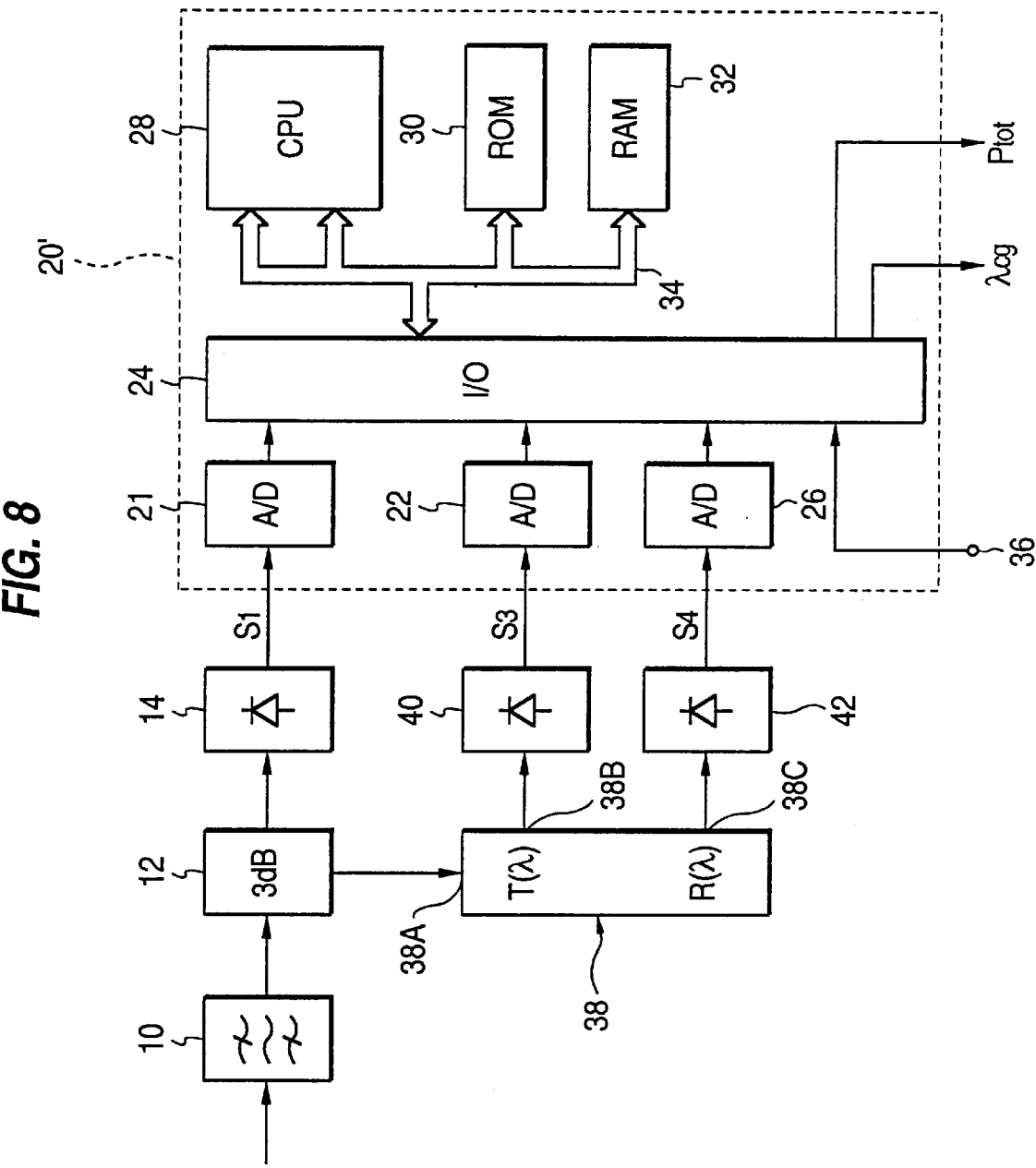
FIG. 8 is a diagram illustrating a monitoring device for monitoring momental wavelength, according to an additional embodiment of the present invention.

FIG. 8 is a diagram illustrating a monitoring device for monitoring momental wavelength, according to an additional embodiment of the present invention. Referring now to FIG. 8, a weighting element 38 has an input port 38A and output ports 38B and 38C. Light passed through an optical band-pass filter 10 is branched into a first branch light beam and a second branch light beam by an optical coupler 12. The first branch light beam is supplied to a photodetector 14 for detecting the total power of input light, as in the monitoring device illustrated in FIG. 6. The second branch light beam is supplied to the input port 38A of weighting element 38.

Weighting element 38 branches the second branch light beam supplied to the input port 38A into a first weighted branch light beam and a second weighted branch light beam. The branching ratio between the first and second weighted branch light beams is given by a:(1−a) where "a" represents a parameter according to the weighting function T(λ). That is, the input port 38A and the output port 38B are related by the weighting function T(λ), whereas the input port 38A and the output port 38C are related by 1−T(λ), where R(λ)=1− T(λ). The first and second weighted branch light beams are supplied to photodetectors 40 and 42, respectively. Output signals from photodetectors 40 and 42 are supplied through A/D converters 22 and 26, respectively, to an I/O port 24. The hardware of a computing unit 20' is substantially similar to computing unit 20 illustrated in FIG. 6, so that a repeat description will be omitted.

In FIG. 8, computing unit 20' selects one of photodetectors 40 and 42 whose output level is larger than the other. The second value $S_2$ is obtained according to the output from the selected one of photodetectors 40 and 42. Accordingly, the accuracy of monitoring of a momental wavelength to be calculated according to the ratio $S_2/S_1$ between the second and first values can be improved. In the following description, a third value $S_3$ and a fourth value $S_4$ correspond, respectively, to the output levels of photodetectors 40 and 42 are used.

Figure 9:
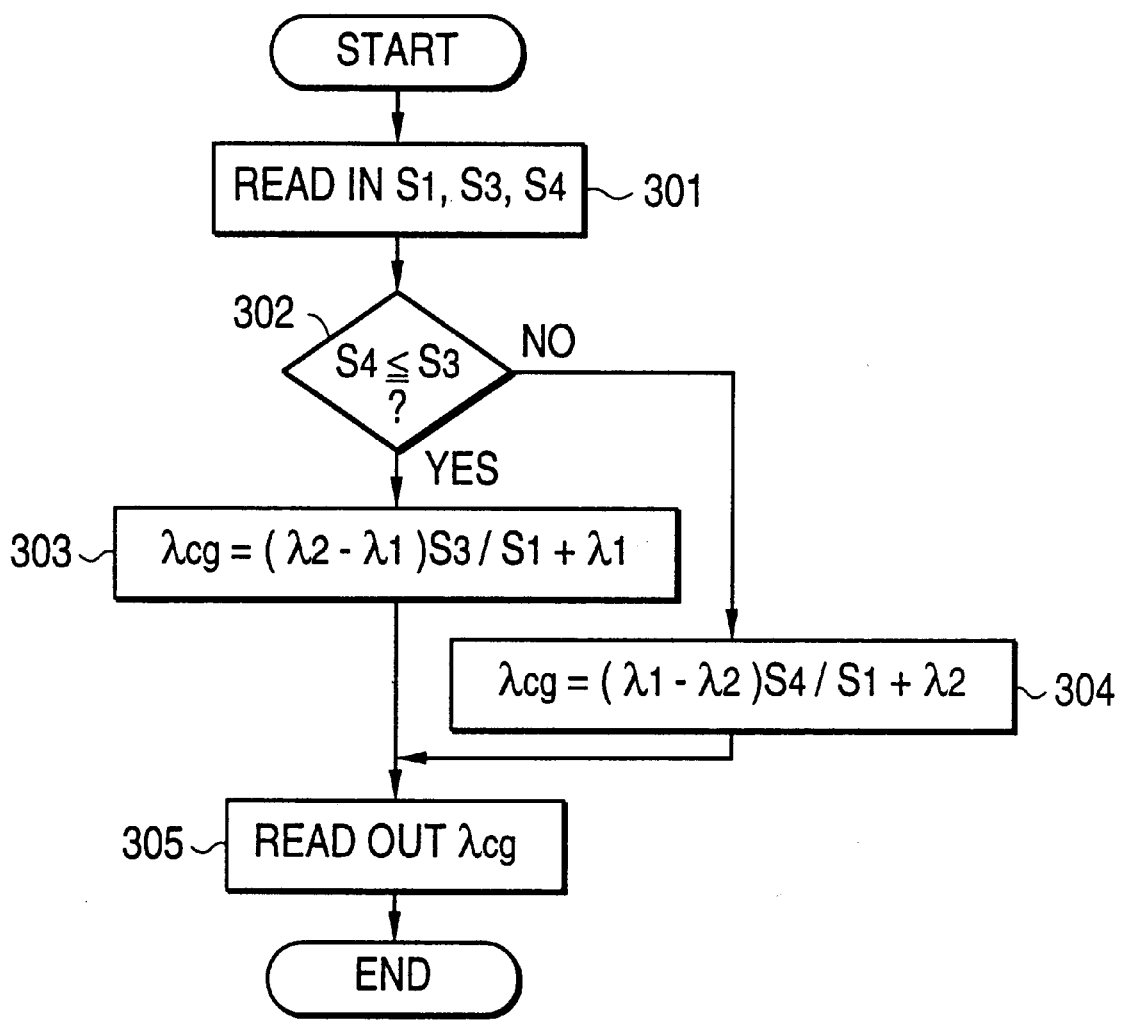
FIG. 9 is a flowchart illustrating the operation of the is monitoring device illustrated in FIG. 8, according to an embodiment of the present invention.

FIG. 9 is a flowchart illustrating the operation of the monitoring device illustrated in FIG. 8, according to an embodiment of the present invention. First, in step 301, the first value $S_1$, the third value $S_3$, and the fourth value $S_4$ are read in accordance with the output signals from photodetectors 14, 40, and 42. From step 301, the process moves to step 302, where the values $S_3$ and $S_4$ are compared with each other. If the value $S_3$ is equal to or larger than the value $S_4$ in step 302, the process moves to step 303. If the value $S_3$ is smaller than the value $S_4$ in step 302, the process moves to step 304. In step 303, the larger third value $S_3$ is adopted as the second value $S_2$ in Equation (6), and a momental wavelength $\lambda_{cg}$ is calculated according to the following Equation (8).

$$\lambda_{cg}=(\lambda_2-\lambda_1)S_3/S_1+\lambda_1 \qquad \text{Equation (8)}$$

In step 304, the larger fourth value S4 (corresponding to the output port 38C of weighting element 38) is adopted as the second value $S_2$ in Equation (6). Accordingly, the weighting function is changed to R(λ)=1−T(λ), and Equation (6) is changed to the following Equation (9).

$$\lambda_{cg}=(\lambda_1-\lambda_2)S_4/S_1+\lambda_2 \qquad \text{Equation (9)}$$

Then, a momental wavelength $\lambda_{cg}$ is calculated according to Equation (9).

From steps 303 and 304, the process moves to step 305, where the momental wavelength $\lambda_{cg}$ calculated in step 303 or 304 is read out.

Figure 10:
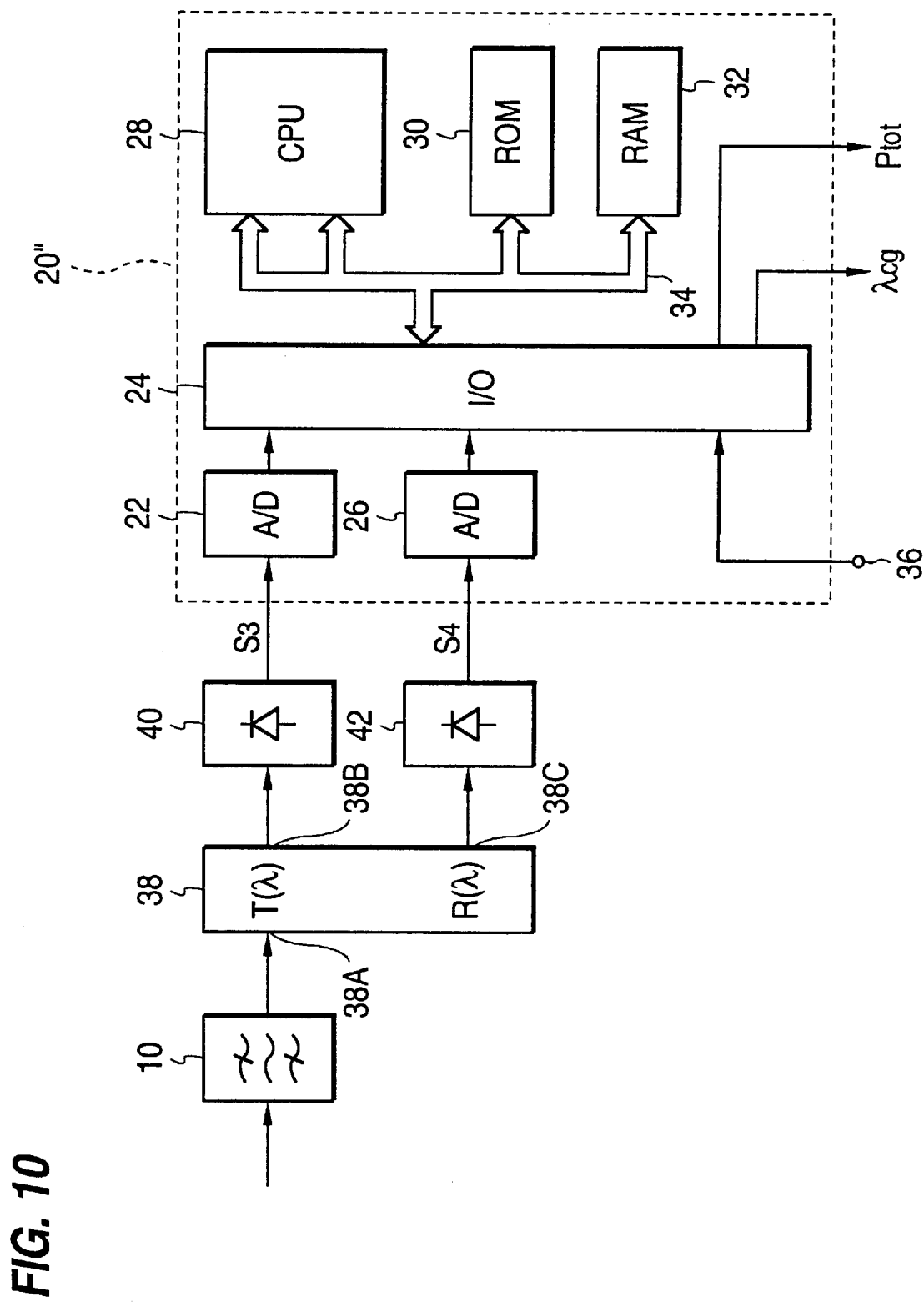
FIG. 10 is a diagram illustrating a monitoring device for monitoring momental wavelength, according to a further embodiment of the present invention.

FIG. 10 is a diagram illustrating a monitoring device for monitoring momental wavelength, according to a further embodiment of the present invention. In contrast to the monitoring device illustrated in FIG. 8, the monitoring device illustrated in FIG. 10 does not require optical coupler 12, photodetector 14 and A/D converter 21. Instead, the entire light output from optical band-pass filter 10 is supplied to input port 34A of weighting element 38. A computing unit 20" calculates the total power $P_{tot}$ of input light according to the third value $S_3$ and the fourth value $S_4$.

Figure 11:
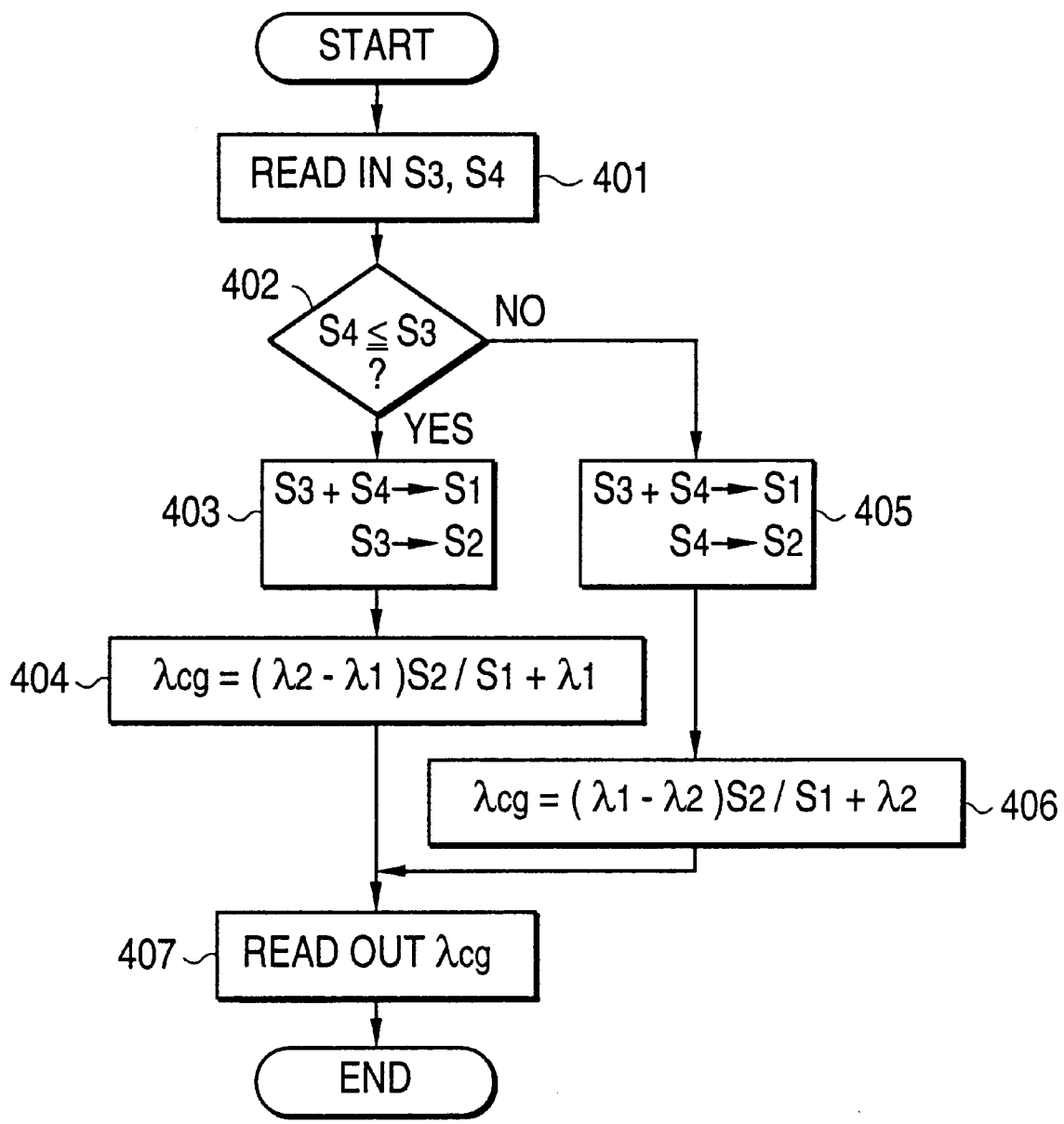
FIG. 11 is a flowchart illustrating the operation of the monitoring device illustrated in FIG. 10, according to an embodiment of the present invention.

FIG. 11 is a flowchart illustrating the operation of the monitoring device illustrated in FIG. 10, according to an embodiment of the present invention. In step 401, the third value $S_3$ and the fourth value $S_4$ are read, according to the output signals from photodetectors 40 and 42. From step 401, the process moves to step 402, where the value $S_3$ and the value $S_4$ are compared with each other. If the value $S_3$ is equal to or larger than the value $S_4$ in step 402, the process moves to step 403. In step 403, the value $S_4$ is added to the value $S_3$, and the sum of the values $S_3$ and $S_4$ is set to the first value $S_1$. Furthermore, the larger third value $S_3$ is set to the second value $S_2$. From step 403, the process moves to step 404, where a momental wavelength $\lambda_{cg}$ is calculated according to Equation (6) by using the values $S_1$ and $S_2$ set in step 403.

If the third value $S_3$ is smaller than the fourth value $S_4$ in step 402, the process moves to step 405. In step 405, the sum of the values $S_3$ and $S_4$ is set to the first value $S_1$, and the larger fourth value $S_4$ is set to the second value $S_2$. From step 405, the process moves to step 406, where a momental wavelength $\lambda_{cg}$ is calculated according to the weighting function R(λ) and the following Equation (10) by using the values $S_1$ and $S_2$ set in step 405.

$$\lambda_{cg}=(\lambda_1-\lambda_2)S_2/S_1+\lambda_2 \qquad \text{Equation (10)}$$

From steps 404 and 406, the process moves to step 407, where the momental wavelength $\lambda_{cg}$ obtained in step 404 or 406 is read out. In this manner, it is possible to provide a monitoring device having a high monitoring accuracy and a simple configuration.

Following are examples of a weighting element, such as weighting element 16 illustrated in FIG. 6 and weighting elements 38 illustrated in FIGS. 8 and 10. Since the function of weighting element 16 is included in the function of weighting element 38, the following example are described on the basis of the function of weighting element 38.

Figure 12:
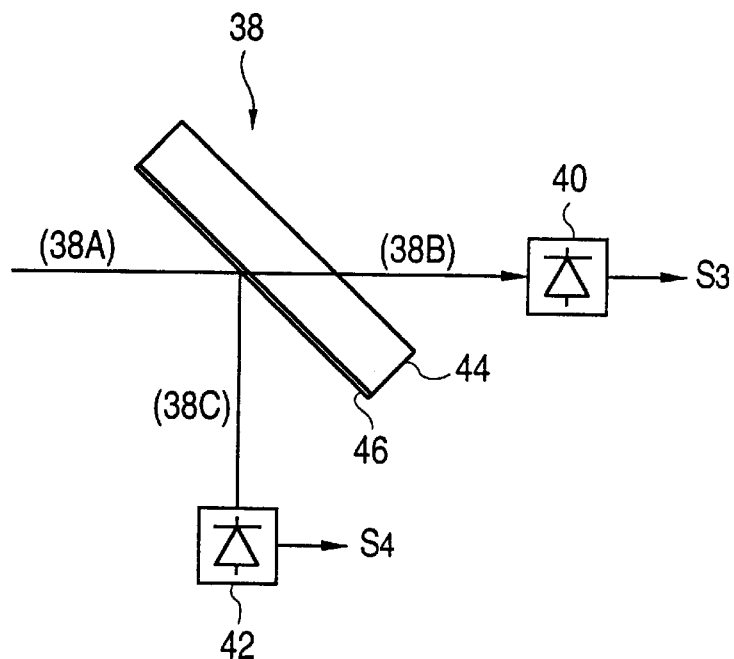
FIG. 12 is a diagram illustrating a weighting element of a monitoring device for monitoring momental wavelength, according to an embodiment of the present invention.

More specifically, FIG. 12 is a diagram illustrating weighting element 38, according to an embodiment of the present invention. Referring now to FIG.12, weighting element 38 includes a transparent substrate 44 and a dielectric multilayer film 46 formed on transparent substrate 44. Multilayer film 46 is formed by alternately laminating low-refractive index layers and high-refractive index layers. The low-refractive index layers and the high-refractive index layers are formed, for example, of $SiO_2$ and $TiO_2$, respectively. Light from input port 38A enters multilayer film 46 at a predetermined incident angle. An optical path of light transmitted straight through weighting element 38 is output at output port 38B, and an optical path of light reflected by multilayer film 46 is output at output port 38C.

Figure 13:
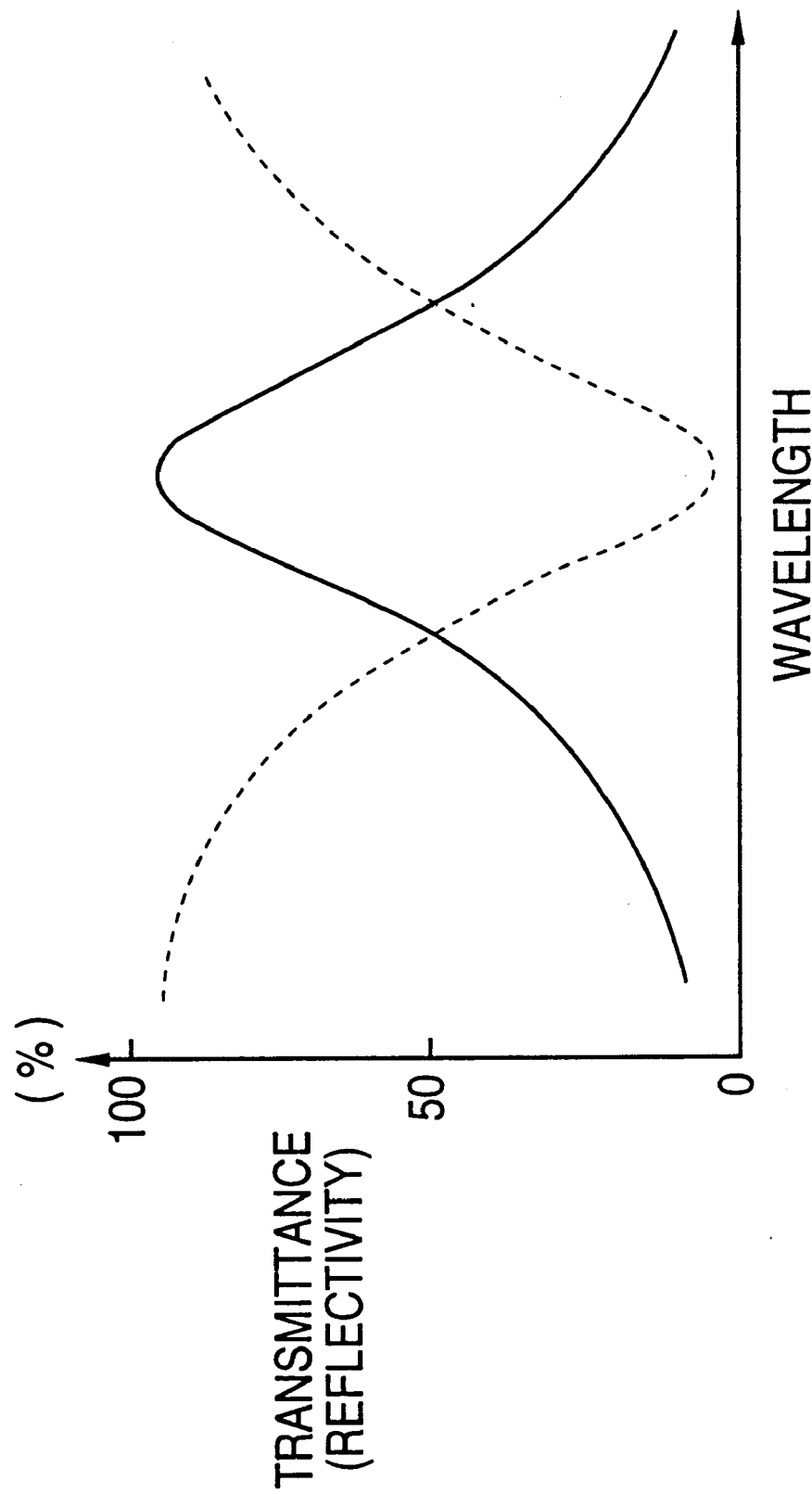
FIG. 13 is a graph illustrating characteristics of the weighting element illustrated in FIG. 12, according to an embodiment of the present invention.

FIG. 13 is a graph illustrating characteristics of weighting element 38 illustrated in FIG. 12, according to an embodiment of a the present invention. In FIG. 13, the solid line represents a wavelength-transmittance characteristic, and the broken line represents a wavelength-reflectivity characteristic. When a certain wavelength is given, the sum of a transmittance and a reflectivity at this wavelength becomes, in principle, 100%. As apparent from FIG. 13, a momental wavelength can be obtained by defining a weighting function in the vicinity of a cross point between the two characteristic curves at their regions where linearity is relatively ensured.

In the above-description, it has been assumed that the value of the weighting function at one of the shortest wavelength and the longest wavelength in a given band is "0" and the value at the other is "1". Alternatively, an offset and/or a gain may be adjusted in a circuit for processing electrical signals from the various photodetectors, thereby obtaining a weighting function whose value at one of the shortest wavelength and the longest wavelength is 0 and whose value at the other is 1. The assumption that one of the shortest wavelength and the longest wavelength in a given band is "0" and the value at the other is "1", is intended to that the calculation of momental wavelength can easily be understood. However, the present invention is not intended to be limited to these values for the weighting function. Also, the weighting functions is not intended to be limited to the characteristics illustrated in FIG. 13. Many different assumptions can be made to simply determination of a momental wavelength based on Equation (6).

Figure 14:
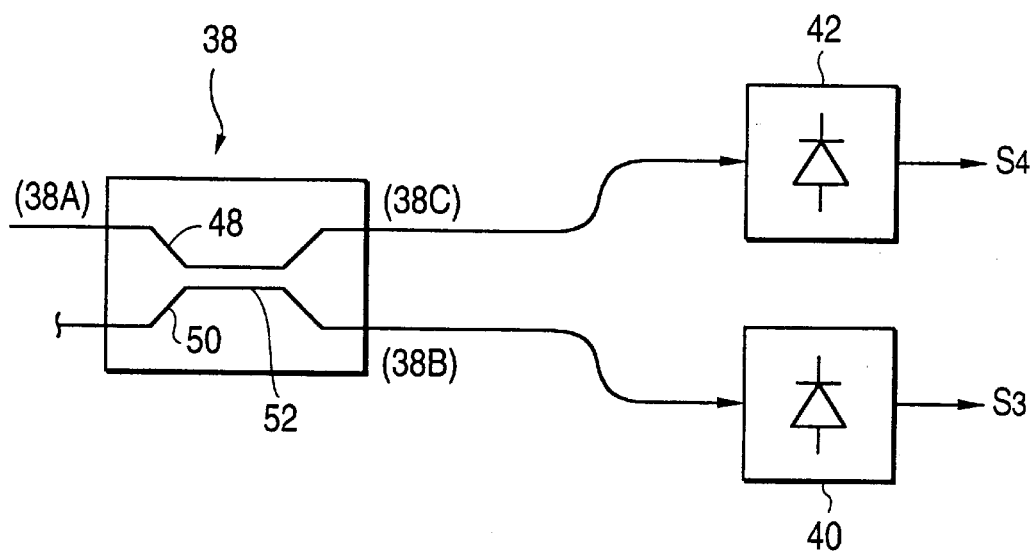
FIG. 14 is a diagram illustrating a weighting element of a monitoring device for monitoring momental wavelength, according to an additional embodiment of the present invention.

FIG. 14 is a diagram illustrating weighting element 38, according to an additional embodiment of the present invention. Referring now to FIG. 14, weighting element 38 is formed by fusion-splicing side surfaces of a first fiber 48 and a second fiber 50, and then drawing a spliced portion of fibers 48 and 50. Reference numeral 52 denotes a spliced/drawn portion. The opposite ends of first fiber 48 correspond to input port 38A and output port 38C, and one end of second fiber 50 on the same side as that of output port 38C corresponds to output port 38B. The other end of second fiber 50 is formed as an anti-reflection end to prevent undue reflection. In spliced/drawn portion 52, the cores of fibers 48 and 50 are very close to each other and the diameter of each core is small, so that optical power is not confined and evanescent wave coupling occurs. In this manner, the power of light propagating in first fiber 48 is coupled to second fiber 50. The coupling ratio is made to have wavelength dependence by suitably setting a shape parameter of spliced/drawn portion 52.

FIG. 15 is a graph illustrating characteristics of the weighting element 38 illustrated in FIG. 14, according to an embodiment of the present invention. Referring now to FIG. 15, a solid line represents a wavelength characteristic of the ratio (coupling ratio) of the power of light output from output port 38B to the power of light input to input port 38A. A solid line shows that the coupling ratio sinusoidally changes with an increase in wavelength. A broken line in FIG. 15 represents a wavelength characteristic of the ratio of the power of light output from port 38C to the power of light input to port 38A. At a certain wavelength, the sum of the two ratios is, in principle, 100%. Accordingly, by using such a fiber spliced type optical coupler, a momental wavelength can be easily obtained. Preferably, the shape parameter of spliced/drawn portion 52 is set so that the wavelength providing a cross point between the two characteristic curves shown in FIG. 15 corresponds to the center wavelength $\lambda_c$ shown in FIG. 2.

A Fabry-Perot optical resonator may also be used as the weighting element. By suitably setting the thickness of a Fabry-Perot etalon and the reflectivity of both end surfaces thereof, a characteristic similar to the characteristic shown in FIG. 13 can be obtained, so that weighting is carried out in a region of the characteristic where high linearity is provided.

Figure 16:
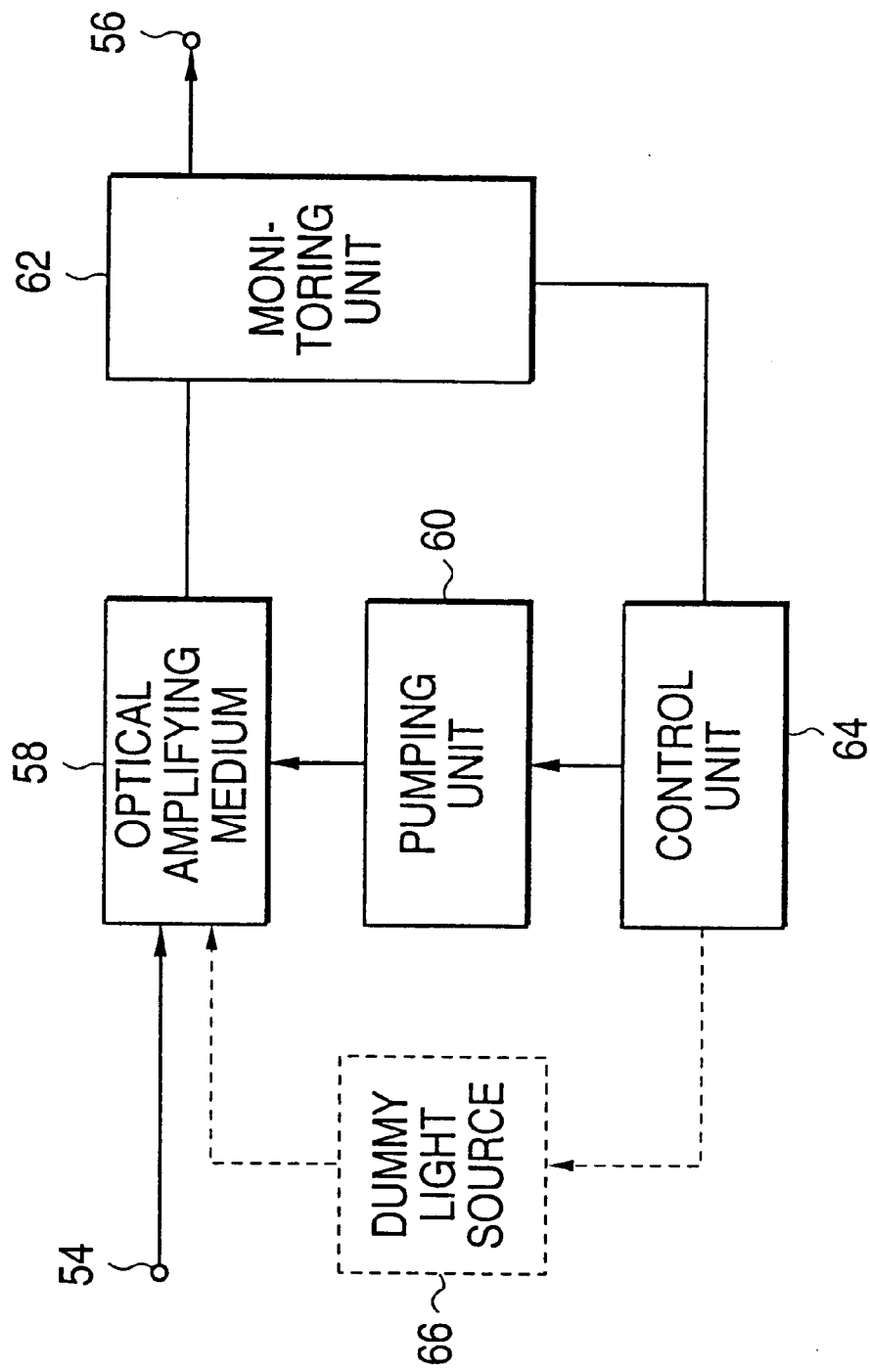
FIG. 16 is a diagram illustrating an optical amplifier, according to an embodiment of the present invention.

FIG. 16 is a diagram illustrating an optical amplifier, according to an embodiment of the present invention. Referring now to FIG. 16, the optical amplifier has an input port 54 to receive signal light to be amplified and an output port 56 to output the amplified signal light. A main optical path is set between input port 54 and output port 56. An optical amplifying medium 58 for receiving the input signal light is provided on the main optical path. A pumping unit 60 pumps optical amplifying medium 58 so that optical amplifying medium 58 has an amplification band (gain band) including the wavelength of the signal light. A monitoring unit 62 is provided on the main optical path. Monitoring unit 62 monitors the momental wavelength of a spectrum of input light. A control unit 64 controls a parameter on which a gain tilt characteristic in the amplification band of the optical amplifying medium 58 depends.

A fiber doped with a rare earth element such as Er (erbium) may be used as optical amplifying medium 58. A typical base material of the doped fiber is silica or fluoride. Alternatively, a semiconductor material may be used as optical amplifying medium 58, to thereby provide a semiconductor optical amplifier. In this case, pumping unit 60 includes a mechanism (not illustrated) for injecting a current into optical amplifying medium 58. More specifically, a pumping voltage is applied across a pair of electrodes of the semiconductor optical amplifier.

Optical amplifying medium 58 has a first end and a second end corresponding, respectively, to the upstream side and the downstream side of the main optical path with respect of the propagation direction of the signal light. Pumping unit 60 is compatible with a doped fiber and includes a pump light source (not illustrated) for providing pump light, and an optical coupler (not illustrated) operatively connected to at least one of the first end and the second end of optical amplifying medium 58 to supply the pump light to optical amplifying medium 58. When components are described herein as being operatively connected together, it is intended that the components are, for example, directly connected by fibers, spatial connected using a collimated beam, and/or indirectly connected through other optical components such as optical filters.

In the case that pumping unit 60 includes a pump light source, the power of pump light may be used as a parameter subjected to control by control unit 64. In this case, the pump light source should not be included in a feedback loop of an automatic level control (ALC) circuit (not illustrated) which maintains the power of signal light to be output from output port 56 to be constant. Accordingly, a feedback loop including an optical attenuator with a variable attenuation factor may be configured for ALC.

If the optical amplifier includes a dummy light source 66 for supplying dummy light having a wavelength included in the amplification band, to optical amplifying medium 58, the power of the dummy light may be used as a parameter subjected to control by control unit 64. In this case, the pump light source may be included in the feedback loop for ALC.

In the case that the optical amplifier is applied to a wavelength division multiplexed (WDM) communication system, WDM signal light is supplied to input port 54. In the optical amplifier, a gain tilt characteristic in the amplification band of optical amplifying medium 58 is controlled in accordance with a monitored momental wavelength monitored, to thereby control the gain tilt of the optical amplifier.

Figure 17:
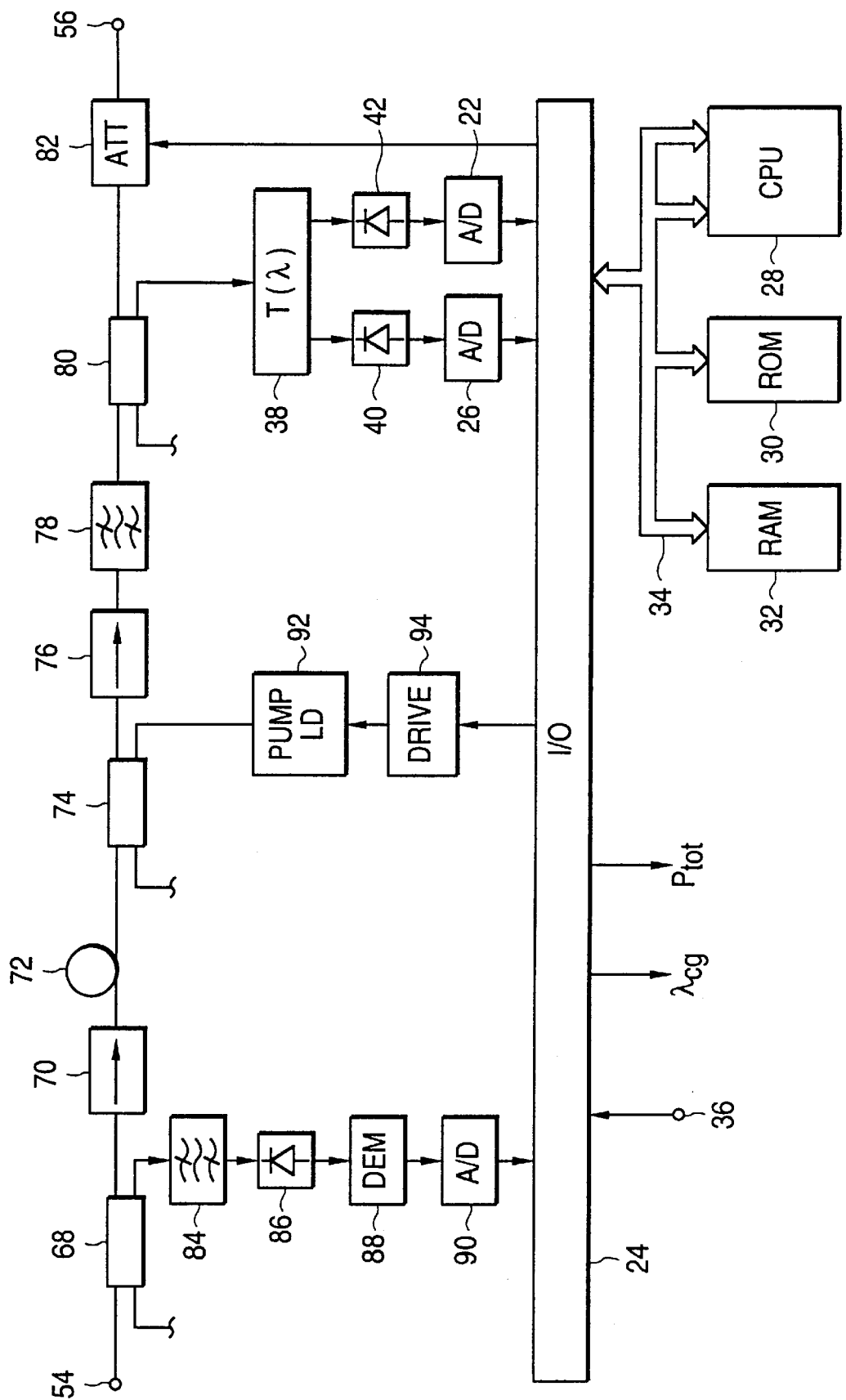
FIG. 17 is a diagram illustrating an optical amplifier, according to an additional embodiment of the present invention.

FIG. 17 is a diagram illustrating an optical amplifier, according to an additional embodiment of the present invention. Referring now to FIG. 17, an optical coupler 68, an optical isolator 70, an erbium doped fiber (EDF) 72, a WDM coupler 74, an optical isolator 76, an optical band-pass filter 78, an optical coupler 80, and an optical attenuator 82 are provided on the main optical path between input port 54 and output port 56, in the propagation direction of signal light.

Signal light supplied to input port 54 is branched into first and second beams by optical coupler 68. The first beam is supplied through optical isolator 70 to a first end of EDF 72, whereas the second beam is supplied to a photodetector 86 through an optical band-pass filter 84 having a pass band including the wavelength of signal light. Photodetector 86 is intended to monitor "supervisory information" to be hereinafter described. An output signal from photodetector 86 is supplied to a demodulator 88. An output signal from demodulator 88 is converted into a digital signal by an A/D converter 90, and the digital signal is then supplied to an I/O port 24.

Pump light from a laser diode 92 as a pump light source is supplied through WDM coupler 74 to a second end of EDF 72. Laser diode 92 is driven by a drive circuit 94. The light amplified in EDF 72 is supplied through WDM coupler 74 and optical isolator 76 to optical band-pass filter 78. Optical band-pass filter 78 has a pass band including the wavelength of signal light. Particularly, in the case that the optical amplifier is applied to a WDM system, the shortest wavelength in the pass band is set shorter than the shortest wavelength of all channels, and the longest wavelength in the pass band is set larger than the longest wavelength of all channels. A signal band in WDM signal light is defined by the shortest wavelength and the longest wavelength of all channels of the WDM signal light. The signal band is included in the amplification band of the optical amplifying medium, so that the signal band sometimes refers to the amplification band in the following description.

The light output from optical band-pass filter 78 is branched into first and second beams by optical coupler 80. The first beam output from optical coupler 80 is supplied through optical attenuator 82 with a variable attenuation factor to output port 56, whereas the second beam output from optical coupler 80 is supplied to a momental wavelength monitoring device. In the present embodiment of the present invention, the configuration of the monitoring device illustrated in FIG. 10 is adopted as the momental wavelength monitoring device; however, optical filter 10 shown in FIG. 10 is omitted because the input light to weighting element 38 has passed through optical band-pass filter 78.

The power of the pump light is controlled so that the monitored momental wavelength becomes a predetermined target value. Preferably, the target value of the momental wavelength is the center wavelength in the pass band of the optical band-pass filter 78, that is, the center wavelength in the signal band.

The control of the power of the pump light will now be described in more detail. When the monitored momental wavelength is longer than the center wavelength, it is decided that upward gain tilt (see FIG. 3) has occurred. To correct this upward gain tilt, the power of the pump light is increased. Conversely, when the monitored momental wavelength is shorter than the center wavelength, it is decided that downward gain tilt (see FIG. 3) has occurred. To correct the downward gain tilt, the power of the pump light is decreased. Such control of the power of the pump light allows the momental wavelength to coincide with the center wavelength, thus suppressing the gain tilt.

The light supplied to weighting element 38 includes an ASE component and a signal light component. Accordingly, in the case that the coincidence of the momental wavelength with the center wavelength does not exactly match the absence of the gain tilt because of the synthesis of the ASE component and the signal light component, a value obtained by adding a positive or negative offset wavelength to the center wavelength may be set as the target value. Further, also in the case that WDM signal light is distributed as shown in FIG. 5A or 5B, such an offset target value is effective for the correction of the gain tilt.

Optical attenuator 82 is feedforward-controlled so that the power of light to be output from output port 56 becomes constant. That is, a table relating attenuation factor and total power to be calculated according to the output signals from photodetectors 40 and 42 is preliminarily stored in a ROM 30, and the attenuation factor of optical attenuator 82 is controlled according to a predetermined program. Alternatively, a mechanism for monitoring the power of output light from optical attenuator 82 may be provided, and the attenuation factor may be feedback-controlled so that a monitor value from the monitoring mechanism becomes constant.

Figure 18:
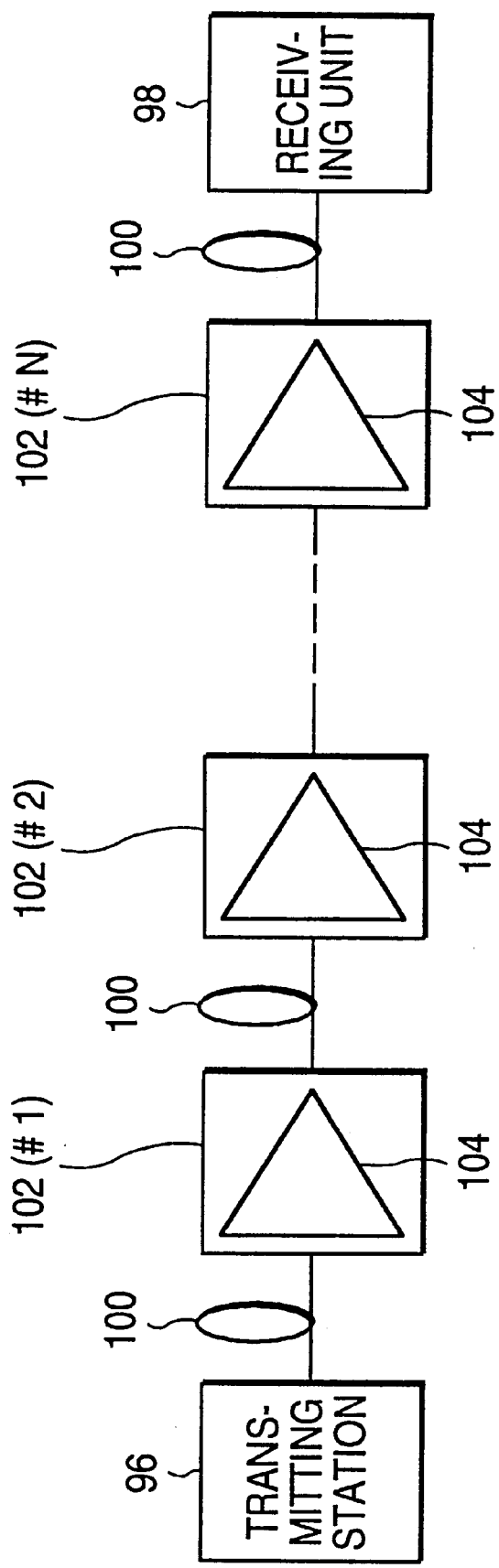
FIG. 18 is a diagram of an optical communication system employing optical amplifiers, according to an embodiment of the is present invention.

FIG. 18 is a diagram of an optical communication system employing optical amplifiers, according to an embodiment of the present invention. Referring now to FIG. 18, a transmitting station 96 transmits WDM signal light, and a receiving station 98 receives the WDM signal light. Transmitting station 96 and receiving station 98 are connected by an optical transmission line 100. A plurality of optical repeaters 102 (#1 to #N) are provided on optical transmission line 100, where N represents the number of all the optical repeaters 102. Each of the optical repeaters 102 (#1 to #N) has a main optical path operatively connected to optical transmission line 100, and an optical amplifier 104 according to above embodiments of the present invention is provided in each main optical path. For example, the optical amplifier shown in FIG. 17 may be used as optical amplifier 104.

Generally, in an optical amplifier, the power of ASE light generated in an optical amplifying medium has wavelength dependence. Accordingly, in the optical communication system shown in FIG. 18, it is preferable to shift the target value of momental wavelength in each optical repeater 102 (#1 to #N) from transmitting station 96 to receiving station 98, as discussed in more detail below.

Figure 19:
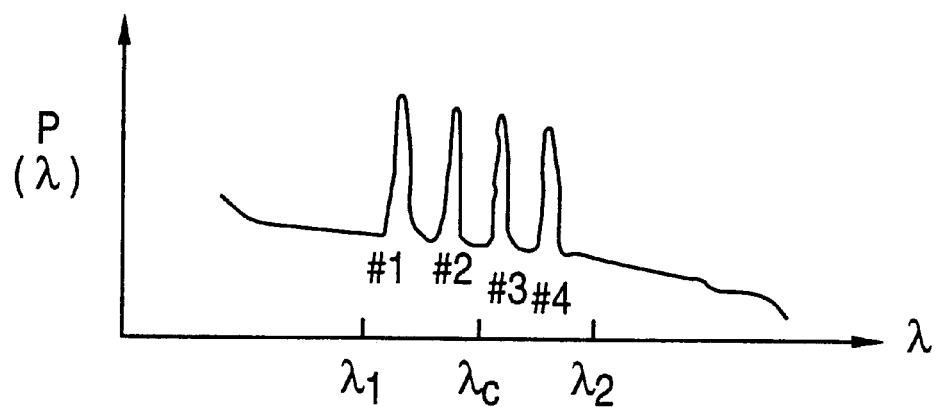
FIG. 19 is a graph illustrating the concept of pre-emphasis, according to an embodiment of the present invention.

FIG. 19 is a graph illustrating the concept of pre-emphasis, according to an embodiment of the present invention. Referring now to FIG. 19, four channels are represented by #1, #2, #3, and #4 from the short wavelength side to the long wavelength side. In an EDFA, the shorter the wavelength, the larger the power of ASE light. Therefore, it is preferable that the output of signal light on the shorter wavelength channel is to be set larger, so as to ensure a required signal-to-noise ratio (SNR) on the shorter wavelength channel. This is due to the fact that the SNR of signal light on each channel is degraded with an increase in the number of optical repeaters and that the degree of such degradation is larger on the shorter wavelength channel than on the longer wavelength channel.

Assuming that WDM signal light is prepared by wavelength-division multiplexing optical signals on four channels in a signal band defined between a shortest wavelength $\lambda_1$ and a longest wavelength $\lambda_2$, a momental wavelength at transmitting station 96 is set to a wavelength $\lambda_0$ slightly shorter than the center wavelength $\lambda_c$ in the signal band. This process is pre-emphasis at transmitting station 96. In this case, a momental wavelength in each optical amplifier 104 is controlled to the momental wavelength $\lambda_0$ set by the pre-emphasis, thereby ensuring a required SNR on the shorter wavelength channel.

In the case that the pre-emphasis is not carried out at transmitting station 96, the target value of the momental wavelength may be shifted to the shorter wavelength side with an increase in number of optical repeaters. Letting $\Delta\lambda$ denote a shift quantity for the target value of the momental wavelength per section between adjacent optical repeaters 102, the target values of momental wavelengths in optical repeaters 102 (#1 to #N) are given as $(\lambda_0-\Delta\lambda)$ to $(\lambda_0-N\Delta\lambda)$, respectively, where $\lambda_0$ represents the target value of momental wavelength at transmitting station 96. In this case, the target wavelength $\lambda_0$ is not necessarily set shorter than the center wavelength $\lambda_c$. For example, the target wavelength $\lambda_0$ may be set equal to the center wavelength $\lambda_c$. Thus, by shifting the target value of momental wavelength, a required SNR can be obtained on the shorter wavelength channel. of course, this shifting process may be combined with the pre-emphasis at transmitting station 96.

Preferably, the optical communication system illustrated in FIG. 18 further includes a mechanism for transmitting supervisory information on the WDM signal light to each optical repeater. For example, the supervisory information is transmitted from transmitting station 96 through optical transmission line 100 to optical repeaters 102 (#1 to #N). In this case, each optical repeaters 102 (#1 to #N) may control so as to obtain a desired characteristic according to the received supervisory information and the monitored momental wavelength. In the case that the supervisory information includes the momental wavelength of WDM signal light or the target value of the momental wavelength, each optical repeater may control so as to obtain a desired gain tilt characteristic. In the case that the supervisory information includes the wavelength of each channel of WDM signal light and data for identification of any channel in operation, each optical repeater may easily calculate the target value of momental wavelength in accordance with the above-described principle.

Figure 20:
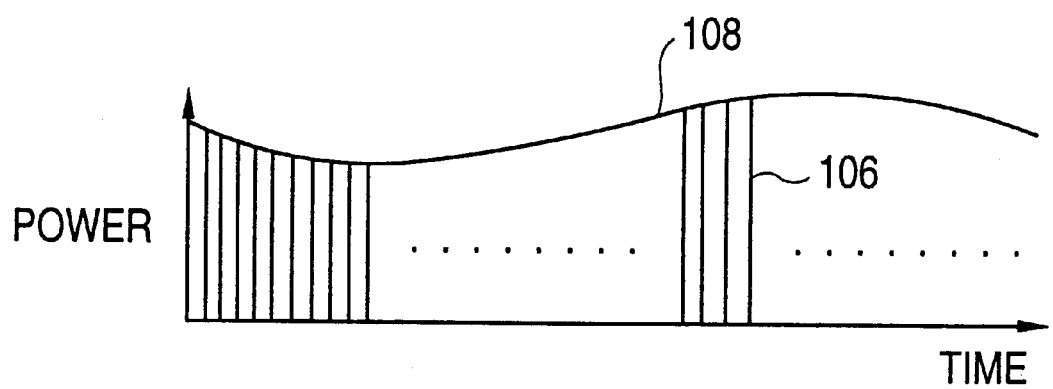
FIG. 20 is a graph illustrating a tone component superimposed on a signal, according to an embodiment of the present invention.

FIG. 20 is a graph illustrating a tone component superimposed on a signal, according to an embodiment of the present invention. Such a superimposed tone component can be used to transmit supervisory information. Referring now to FIG. 20, a tone component 108 which is slower than transmission data 106 is superimposed on at least one channel of WDM signal light. Then, modulation according to supervisory information is performed by using tone component 108 as a subcarrier. The frequency of tone component 108 is set, for example, in the range of 1 kHz to 1 MHz, so that the frequency component is not attenuated in the optical amplifier. Further details of such a technique for transmitting supervisory information is described in, for example, M. Murakami et al, "A Remote Supervisory System Based on Subcarrier Overmodulation for Submarine Optical Amplifier Systems", J. Lightwave Technol., Vol. 14, No. 5, pp. 671–677, which is incorporated herein by reference. Moreover, the supervisory information may be transmitted by signal light on a specific channel without modulation by transmission data, rather transmitted by the tone component.

A manner of reproducing the supervisory information is illustrated, for example, by referring to FIG. 17. More specifically, in FIG. 17, a signal band of WDM signal light branched from optical coupler 68 is extracted by optical band-pass filter 84. Then, the WDM signal light in the signal band is converted into an electrical signal by photodetector 86, and the electrical signal is supplied to demodulator 88. Demodulator 88 includes a band-pass filter (not illustrated) for extracting a tone component and a mechanism (not illustrated) for demodulating supervisory information according to the extracted tone component. Accordingly, even when WDM signal light on all channels is supplied to photodetector 86, the supervisory information can be reproduced. The supervisory information thus reproduced is supplied through A/D converter 90 to I/O port 24.

Figure 21:
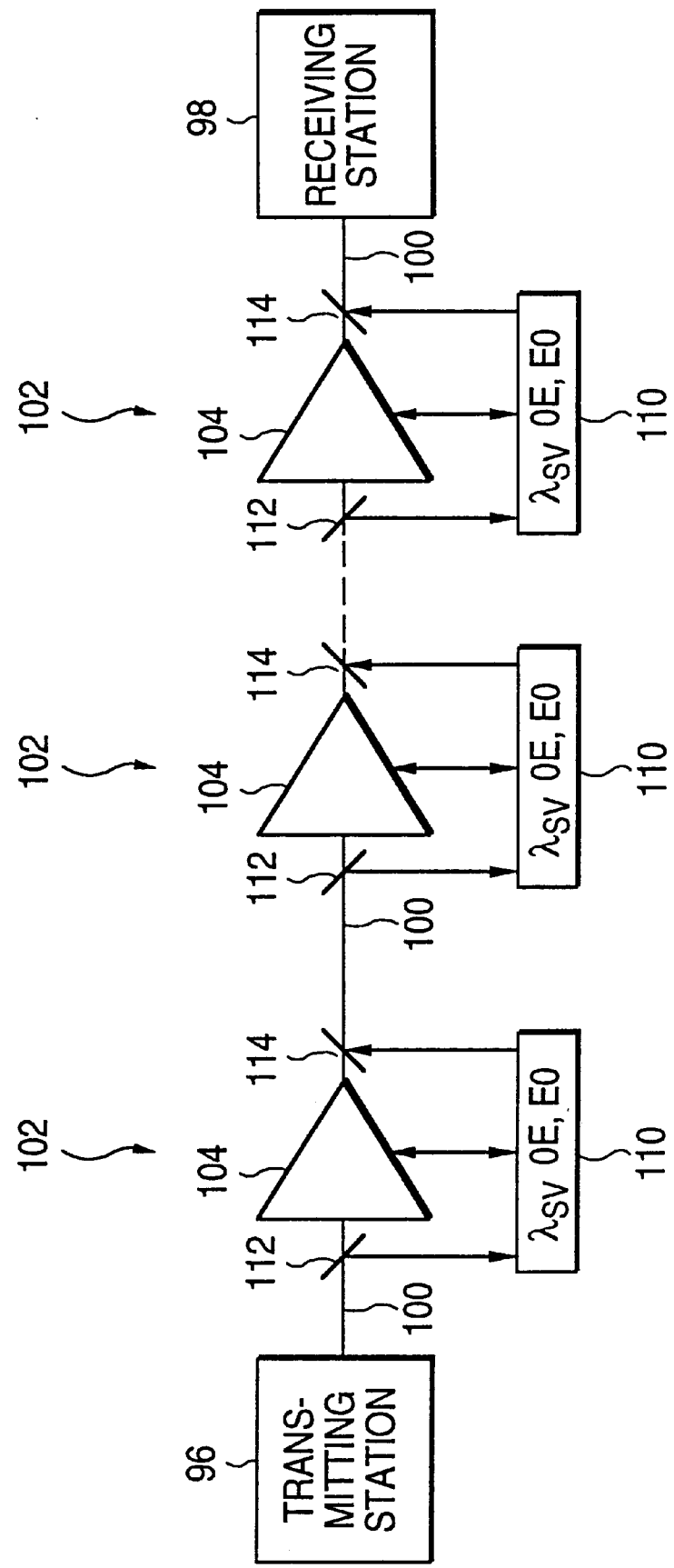
FIG. 21 is a diagram of an optical communication system employing optical amplifiers, according to an additional embodiment of the present invention.

FIG. 21 is a diagram of an optical communication system employing optical amplifiers, according to an additional embodiment of the present invention. In this system, supervisory information is transmitted by using supervisory light having a wavelength $\lambda$sv different from the wavelengths of signal light. Referring now to FIG. 21, a plurality of optical repeaters 102 are provided on an optical transmission line 100. Each optical repeater 102 has an optical amplifier 104 according to the above-described embodiments of the present invention, and a supervisory device 110 for receiving supervisory light to reproduce supervisory information. The supervisory light is obtained by branching the signal light in a WDM coupler 112 located upstream of each optical amplifier 104, and the supervisory light from WDM coupler 112 is supplied to supervisory device 110.

Supervisory device 110 demodulates supervisory information according to the supervisory light and transmits the demodulated supervisory information to the corresponding optical amplifier 104. In some cases, supervisory device 110 receives additional information to be added to the supervisory information from the corresponding optical amplifier 104. Supervisory device 110 has an opto-electric converter to demodulate the supervisory information. Supervisory device 110 further has an electro-optic converter to send the supervisory information demodulated or the supervisory information including the additional information to the next stage. The new supervisory light sent from the electro-optic converter is joined to the WDM signal light by a WDM coupler 114 located downstream of the respective optical amplifier 104.

According to this system, the momental wavelength monitored in each optical repeater 102 can be transmitted to the next, or downstream optical amplifier 102 or to receiving station 98. Accordingly, if the momental wavelength in a certain optical repeater has changed because of, for example, failure, this optical repeater can be identified. As a modification, two-way communication may be applied to the system shown in FIG. 21 to allow supervisory light to be transmitted from receiving station 98 to transmitting station 96.

Figure 22:
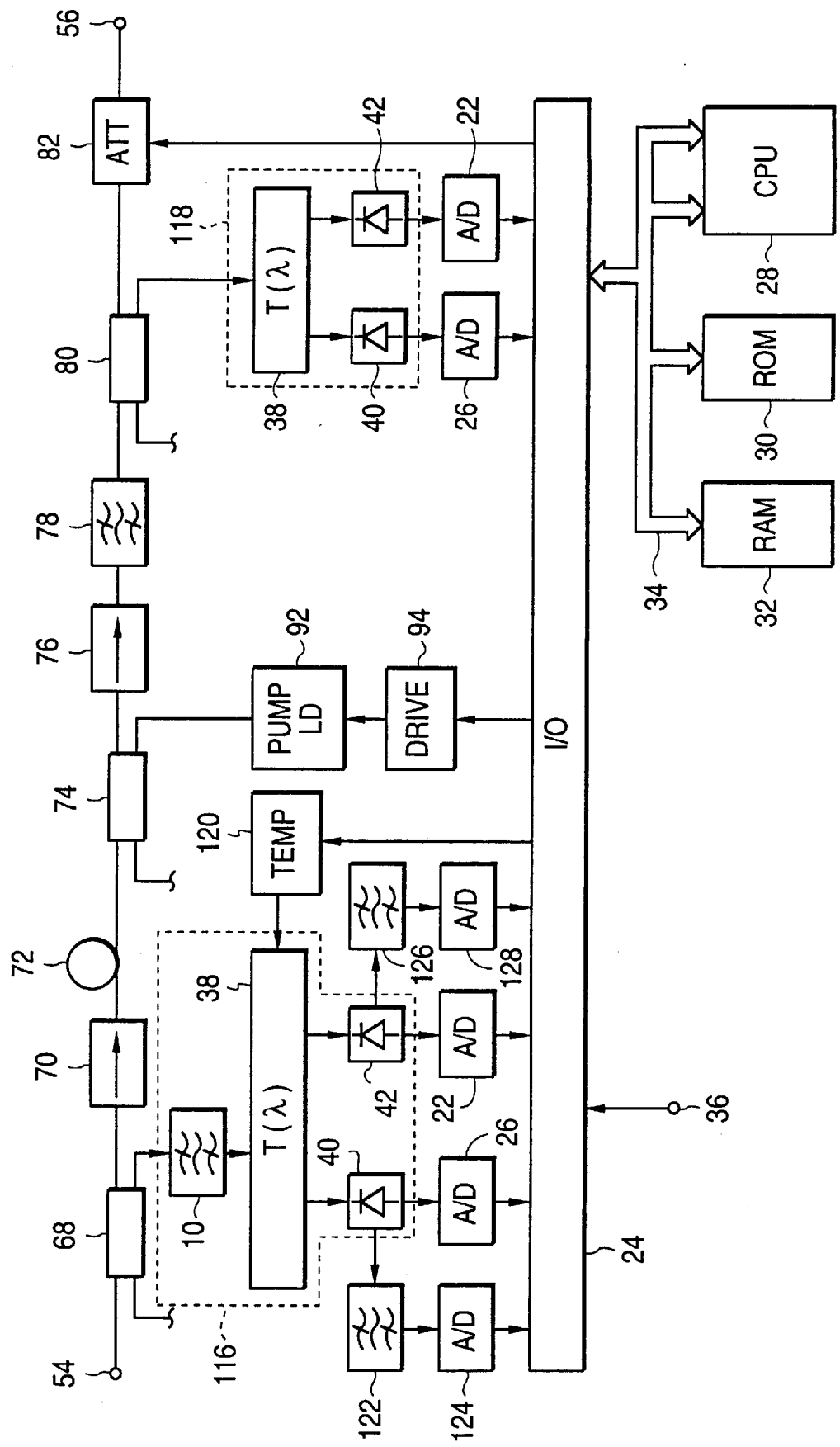
FIG. 22 is a diagram illustrating an optical amplifier, according to a further embodiment of the present invention.

FIG. 22 is a diagram illustrating an optical amplifier, according to a further embodiment of the present invention. Referring now to FIG. 22, the optical amplifier includes monitor units 116 and 118 operatively connected to a first end and a second end, respectively, of an EDF 72. Monitor unit 116 receives light branched off by an optical coupler 68, and monitor unit 118 receives light branched off by an optical coupler 80. Monitor unit 118 includes a weighting element 38 and photodetectors 40 and 42 similar to those shown in FIG. 17, so as to monitor a momental wavelength. Monitor unit 116 includes an optical band-pass filter 10 for limiting a band of input light, in addition to similar components as in monitor unit 118.

The use of two monitor units 116 and 118 allows monitoring of a first momental wavelength of a spectrum corresponding to input light to input port 54 and a second momental wavelength of a spectrum corresponding to output light from output port 56.

Preferably, the power of pump light output from laser diode 92 is controlled so that the first momental wavelength becomes substantially equal to the second momental wavelength. In the case that the shifting of momental wavelength on the basis of pre-emphasis as described above is carried out, the power of pump light is controlled so that the first momental wavelength becomes equal to a value obtained by adding a given offset to the second momental wavelength.

In many cases, the weighting function in weighting element 38 is sensitive to environment temperature. For example, when the temperature of dielectric multilayer film 46 shown in FIG. 12 or the temperature of spliced/drawn portion 52 shown in FIG. 14 changes, the weighting function shifts in the direction of the wavelength axis. Accordingly, it is preferable to control the temperature of weighting element 38, so as to prevent the shift of the weighting function and thereby improve the accuracy of monitoring of momental wavelength. Such temperature control will now be described for monitor unit 116 shown in FIG. 22.

Referring again to FIG. 22, a temperature controller 120 controls the temperature of weighting element 38 of monitor unit 116. The control by temperature controller 120 will now be described.

A light signal in the WDM signal light is used as a pilot light, and the wavelength of the pilot light is accurately controlled. The pilot light has a line spectrum or a sharp spectrum having a narrow bandwidth. Accordingly, the power of the pilot light supplied from weighting element 38 to photodetector 40 is determined by the weighting function T(λ) shown in FIG. 2 and the wavelength of the pilot light. Also, the power of the pilot light supplied from weighting element 38 to the photodetector 42 is determined by the weighting function R(λ) shown in FIG. 2 and the wavelength of the pilot light. If the ratio between these powers is maintained at a constant value, the weighting function is also maintained at a constant value, and the shift of the weighting function can be prevented. The ratio between these powers may be detected by using a tone component as described with reference to FIG. 20. That is, the pilot light is preliminarily modulated by a tone component having a constant amplitude. Then, the ratio in amplitude between two tone components obtained from two branch light beams output from weighting element 38 is calculated. This ratio corresponds to the ratio in power between the two weighted beams.

The output signals from photodetectors 40 and 42 are supplied to band-pass filters 122 and 126, respectively. Each filter 122 and 126 has a pass band including the frequency of the corresponding tone component. The tone components passed through filters 122 and 126 are supplied through A/D converters 124 and 128, respectively, to I/O port 24. Then, the temperature of weighting element 38 is controlled so that the ratio in amplitude between the two tone components obtained through the photodetectors 40 and 42 becomes constant.

While the above-mentioned temperature control of the weighting element is performed on the assumption that the wavelength of the pilot light is stabilized as an absolute wavelength, the temperature control technique according to the present invention may be applied to a WDM system in which the wavelength of the pilot light is not stabilized to an absolute wavelength. For example, also in the case that only the spacing between wavelengths of WDM light signals is controlled to effect relative wavelength stabilization of the WDM light signals, the shift of the weighting function can be prevented by the above-mentioned temperature control.

Figure 23:
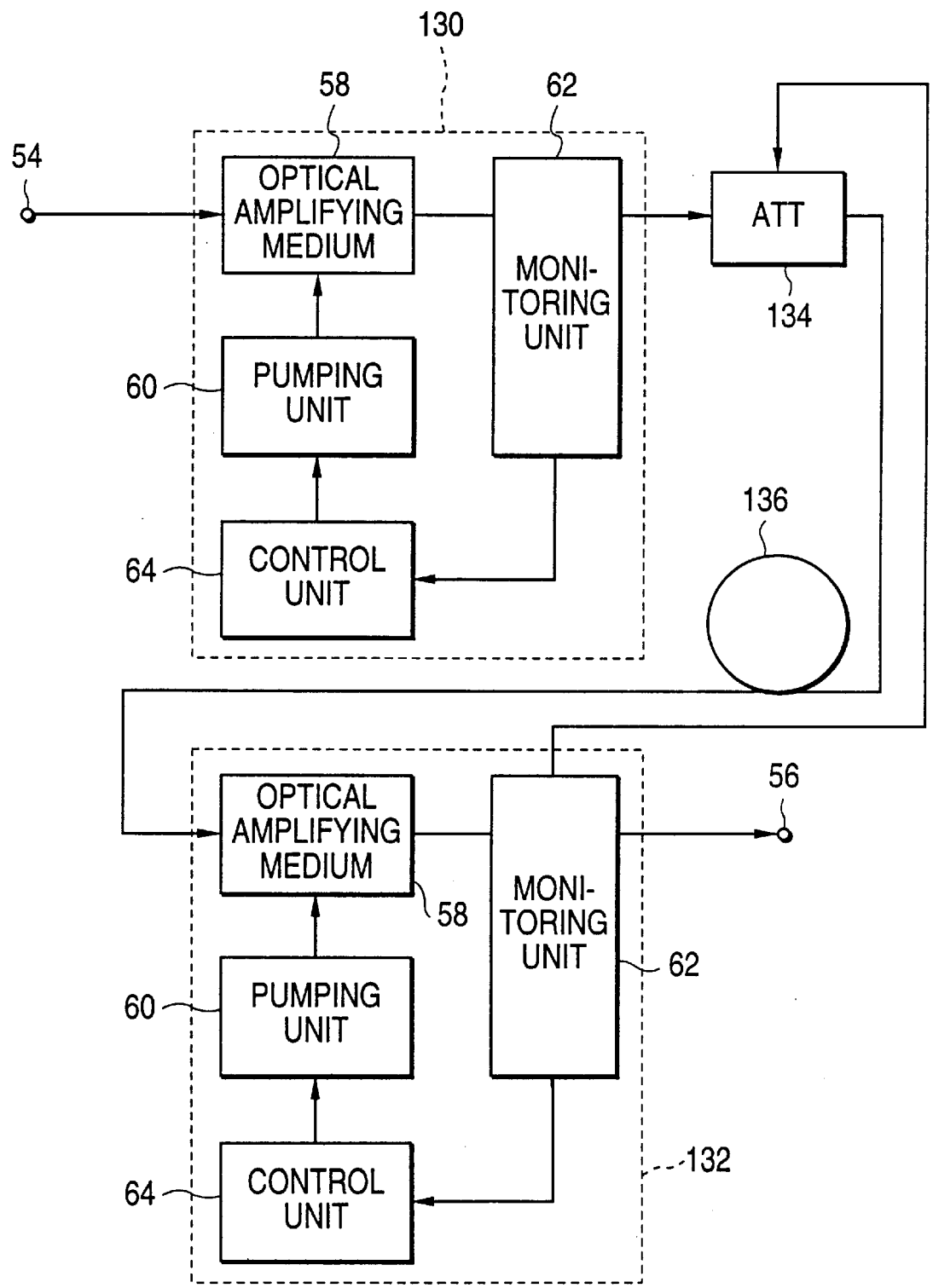
FIG. 23 is a diagram illustrating an optical amplifier, according to a still further embodiment of the present invention.

FIG. 23 is a diagram illustrating an optical amplifier, according to a still further embodiment of the present invention. Referring now to FIG. 23, a first optical amplifier 130 and a second optical amplifier 132 are provided on a main optical path between input port 54 and output port 56, in the propagation direction of signal light. First optical amplifier 132 and second optical amplifier 132 each have a configuration as shown in FIG. 16. The light amplified by first optical amplifier 130 is attenuated by an optical attenuator 134 with a variable attenuation factor, and is then transmitted through a dispersion compensation fiber (DCF) 136 to second optical amplifier 132. DCF 136 has a dispersion value which cancels color dispersion (wavelength dispersion) undergone by the signal light in the transmission line.

Such a two-stage arrangement of optical amplifiers is useful for two reasons. First, a loss in a DCF is relatively large, and it is therefore necessary to increase the level of the signal light on the upstream side of DCF 136 to some extent. Second, if the gain of an optical amplifier on the upstream side of DCF 136 is set too large, excess power of each WDM light signal will cause undesirable nonlinear effects to occur in DCF 136. Such nonlinear effects can include four-wave mixing (FWM). If FWM occurs in DCF 136 in a WDM system, interchannel crosstalk is increased. Further, self-phase modulation (SPM) also invites the degradation in signal quality.

In each optical amplifiers 130 and 132, the power of pump light is controlled according to the monitored momental wavelength. To perform automatic level control (ALC), the attenuation factor in optical attenuator 134 is feedback-controlled so that the total power monitored in monitoring unit 62 of second optical amplifier 132 becomes constant.

The control of momental wavelengths in optical amplifiers 130 and 132 is performed, for example, in the following manner. The momental wavelength in optical amplifier 130 of the first stage is controlled to be shorter than the center wavelength $\lambda_c$, thereby obtaining the downward gain tilt. The momental wavelength in optical amplifier 132 of the second stage is controlled to be longer than the center wavelength $\lambda_c$, thereby obtaining the upward gain tilt. Then, the total gain tilt in the two optical amplifiers 130 and 132 is controlled to be flat. Such control of the momental wavelengths allows a reduction in noise and an improvement in efficiency of the optical amplifier.

While monitoring unit 62 shown in FIG. 16 is located downstream of optical amplifying medium 58 with respect of the propagation direction of signal light, the location of monitoring unit 62 is not limited to that shown in FIG. 16. For example, monitoring unit 62 may be located upstream of optical amplifying medium 58, that is, between input port 54 and optical amplifying medium 58. In this case, monitoring unit 62 can monitor the momental wavelength of input light as in monitor unit 116 shown in FIG. 22, and can also monitor the momental wavelength of backward ASE light.

In optical amplifying medium 58, not only forward ASE light propagating in the same direction as the propagation direction of signal light, but also backward ASE light propagating in the direction opposite to the propagation direction of signal light, is generated. Accordingly, by adding a mechanism for extracting the backward ASE light from the main optical path, the above-mentioned monitoring for the backward ASE light is allowed. Optical coupler 68 located upstream of the EDF 72 as illustrated in FIG. 22, is an example of such an extracting mechanism. In this case, optical isolator 72 interfering with the propagation of the backward ASE light is displaced between input port 54 and optical coupler 68, and the backward ASE light is extracted from one remaining port of optical coupler 68. The backward ASE light extracted is supplied to a monitoring device configured, for example, as monitor unit 116.

Further, monitoring unit 62 shown in FIG. 16 may be located along optical amplifying means 58. In the case that optical amplifying means 58 has an optical waveguide structure as in an EDF, spontaneous emission light (SE light) leaks sideways out of optical amplifying medium 58. Accordingly, monitoring unit 62 monitors the momental wavelength of the leaked SE light.

Figure 24:
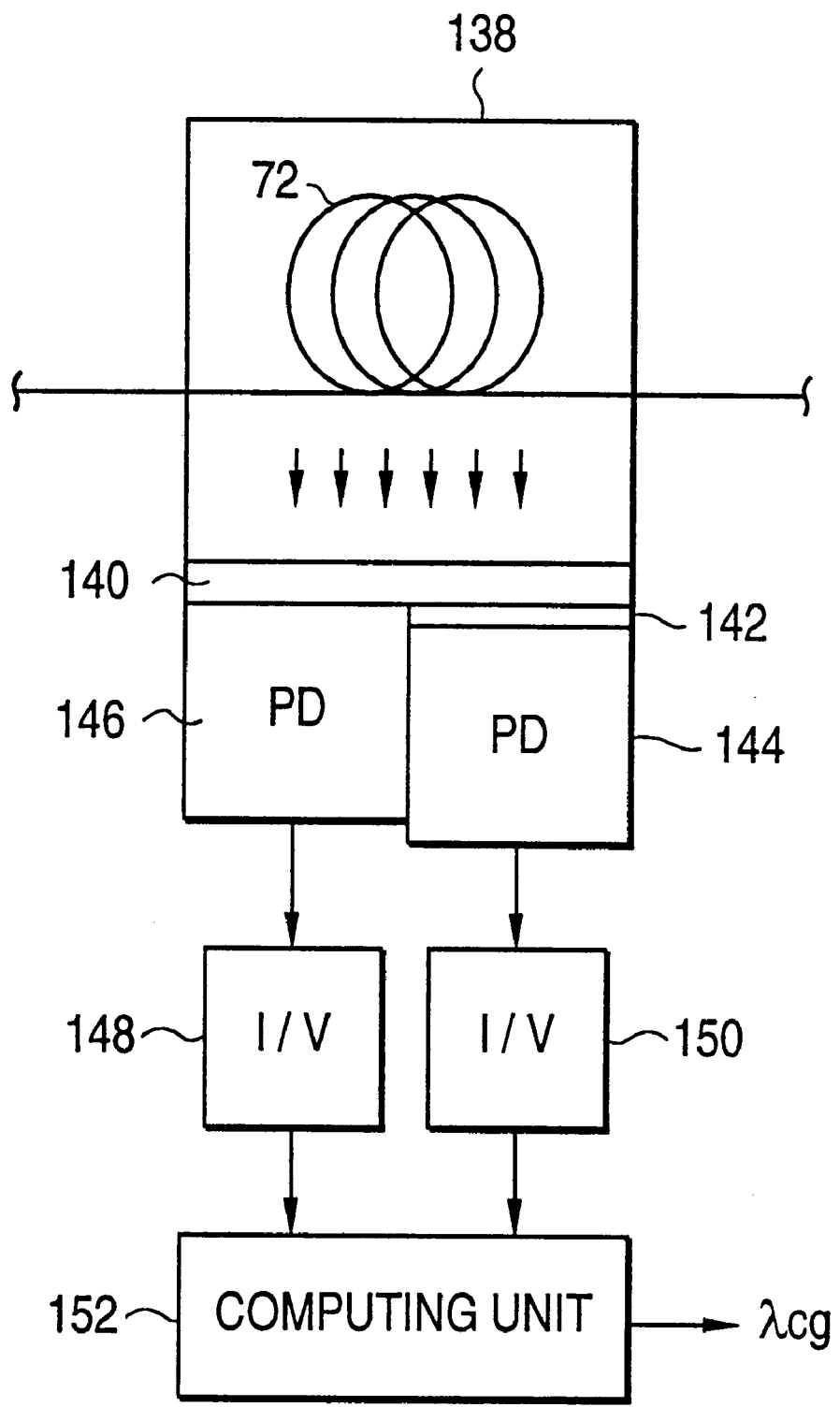
FIG. 24 is a diagram illustrating an optical amplifier according to an additional embodiment of the present invention.

FIG. 24 is a diagram illustrating an optical amplifier according to an additional embodiment of the present invention. Referring now to FIG. 24, an EDF 72 is used as the optical amplifying medium. A mechanism for pumping EDF 72 is not illustrated in FIG. 24. EDF 72 is contained in a case 138, such as an integrating sphere configured so as to cut off external light. The sheath of EDF 72 has a partially cutout portion, and SE light leaks sideways out of EDF 72 from the partially cutout portion.

The SE light is supplied to an optical band-pass filter 140. The pass band of filter 140 is set to a signal band, for example. A part of the SE light passed through filter 140 is supplied through a weighting element 142 (e.g., the dielectric multilayer film 46 shown in FIG. 12) to a photodetector 144, and the remaining part of the SE light passed through filter 140 is supplied to a photodetector 146. In the case that photodetectors 144 and 146 include photodiodes, the output signals from photodetectors 144 and 146 are given as current signals, so that the current signals are to be converted into voltage signals (I/V conversion). That is, the output signal from photodetector 146 is supplied to an I/V converter 148, and the output signal from the photodetector 144 is supplied to an I/V converter 150. The output voltages from I/V converters 148 and 150 are supplied to a computing unit 152. Computing unit 152 performs computation in accordance with the principle shown in FIG. 2, for example, to calculate the momental wavelength $\lambda_{cg}$ of the SE light. Since the gain tilt in an EDFA is reflected on the spectrum of the SE light, various kinds of control as illustrated previously may be performed according to the momental wavelength $\lambda_{cg}$ of the SE light.

Figure 25:
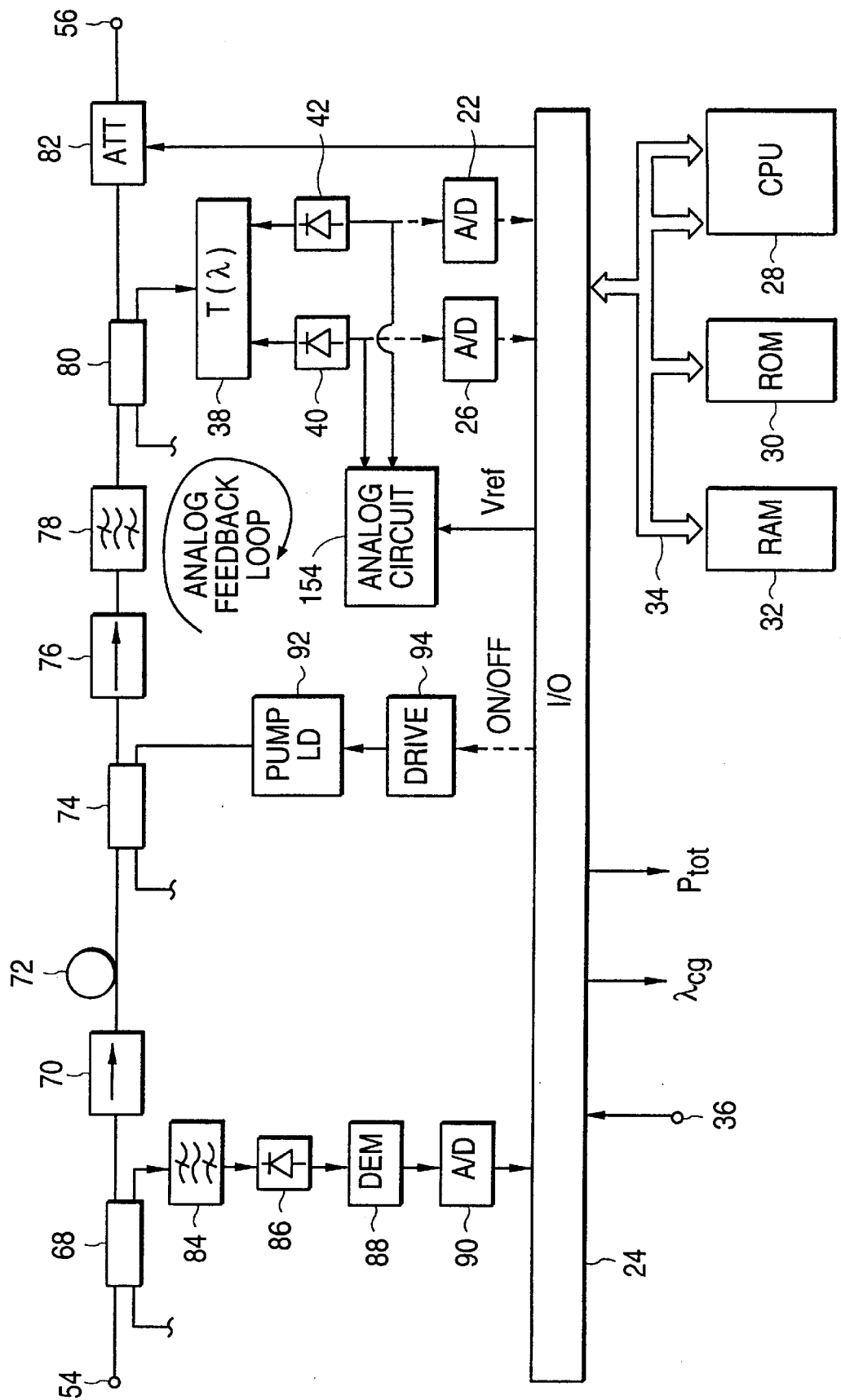
FIG. 25 is a diagram illustrating a modification to the optical amplifier illustrated in FIG. 17, according to an embodiment of the present invention.

FIG. 25 is a diagram illustrating a modification to the optical amplifier illustrated in FIG. 17, according to an embodiment of the present invention. While FIG. 17 illustrates an optical amplifier having a digital feedback loop which includes a digital processing unit (that is, CPU 28) for calculating the momental wavelength, FIG. 25 illustrates an optical amplifier having an analog feedback loop for calculating the momental wavelength.

Referring now to FIG. 25, an analog feedback loop includes an analog circuit 154 for determining the momental wavelength. Analog circuit 154 is connected to photodetectors 40 and 42 and drive circuit 94. Although CPU 28 in FIG. 25 is not used to control the power of the pump light based on the momental wavelength, CPU 28 may be used, for example, to supply drive circuit 94 with an ON/OFF signal to shut down control in case of system failure, or to generate a reference voltage Vref (described in more detail further below).

Figure 26:
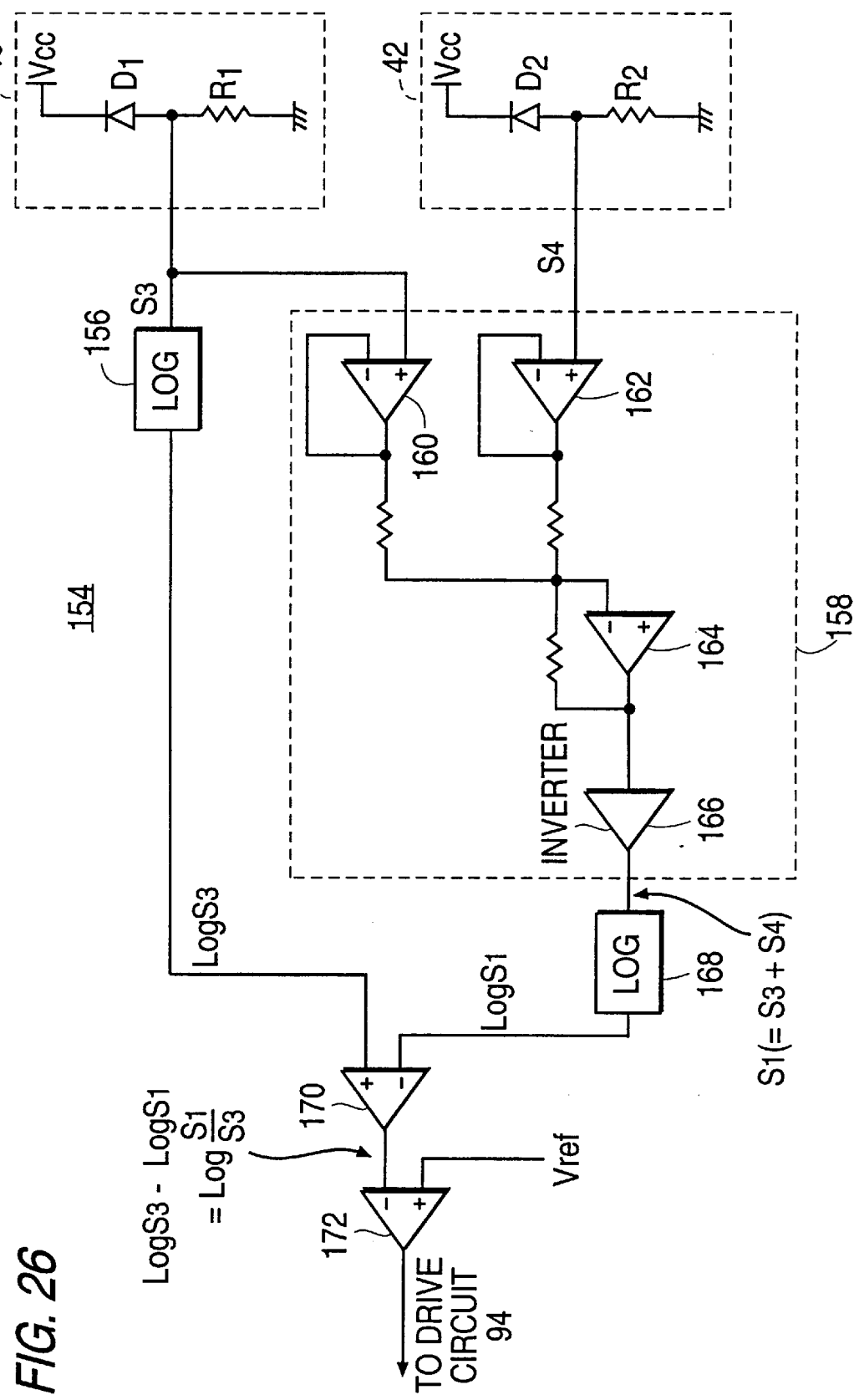
FIG. 26 is a diagram illustrating an analog circuit of the optical amplifier illustrated in FIG. 25, according to an embodiment of the present invention.

FIG. 26 is a diagram illustrating analog circuit 154 of the optical amplifier illustrated in FIG. 25, according to an embodiment of the present invention. Referring now to FIG. 26, photodetector 40 comprises a photodiode D1 and a resistor R1. Photodiode D1 and resistor R1 are connected in series between a voltage supply line Vcc and ground, such that photodiode D1 is biased in reverse. Similarly, photodetector 42 comprises a photodiode D2 and a resistor R2. The anode voltage levels of photodiodes D1 and D2 correspond, respectively, to the values S3 and S4 (see FIG. 10). The output voltage of photodetector 40 is supplied to a logarithmic amplifier (LOG) 156. The output voltage signals of photodetectors 40 and 42 are supplied to a summing block 158. Summing block 158 includes a first voltage follower 160 supplied with the signal from photodetector 40, a second voltage follower 162 supplied with the signal from photodetector 42, a summing amplifier 164 supplied with the output signals from voltage followers 160 and 162, and an inverter 166 for inverting the polarity of the output of summing amplifier 164. Voltage followers 160 and 162, summing amplifier 164 and inverter 166 may be operational amplifiers. The output signal of inverter 166 is supplied to a logarithmic amplifier 168. Since the sum of the values S3 and S4 gives the value S1, the output signal of logarithmic amplifier 168 corresponds to Log S1. The output signal (Log S3) of logarithmic amplifier 156 and the output signal (Log S1) of logarithmic amplifier 168 are supplied to an operational amplifier 170 in order to obtain an error signal. The error signal corresponds to the value (Log S3 −Log S1) which equals Log (S3/S1). The error signal is supplied to an operational amplifier 172 for negative feedback control. Operational amplifier 172 outputs a control signal to be supplied to drive circuit 94 (see FIG. 25), such that the error signal is fixed to the reference voltage Vref. Through the structure of the above analog feedback loop, the power of the pump light can be controlled so that the momental wavelength becomes a predetermined target value. The target value may be set by adjusting the reference voltage Vref.

Therefore, according to the above embodiments of the present invention, a control unit can perform control, for example, by either a digital feedback loop or an analog feedback loop.

According to the above embodiments of the present invention, an apparatus monitors a momental wavelength of a spectrum of input light. In this apparatus, a first detecting unit detects a first value corresponding to total power of the input light. All or part of the input light is supplied to a weighting unit. An input to and an output from the weighting unit are related by a weighting function T($\lambda$) approximated by a linear function of wavelength $\lambda$. A second detecting unit detects a second value corresponding to power of light output from the weighting unit. A computing unit is operatively connected to the first and second detecting units to calculate a momental wavelength $\lambda_{cg}$ according to the first and second values.

The momental wavelength $\lambda_{cg}$ can be defined by an expression of:

$$\lambda_{cg} = \int \lambda P(\lambda) d\lambda / \int P(\lambda) d\lambda$$

where P($\lambda$) represents the spectrum of the input light. The momental wavelength may be intuitively understood as a wavelength giving a centroid (center of figure) of the spectrum.

The present invention is not limited by a definition by wavelength. A change in wavelength is substantially proportional to a change in frequency in a limited range. That is, a change $\Delta\lambda$ in wavelength and a change $\Delta\upsilon$ in frequency are related by the following equation:

$$\Delta\lambda = (\lambda^2/c)\Delta\upsilon$$

where $\lambda$ represents wavelength and c represents the velocity of light. Generally, a wavelength change and a frequency change are proportional to each other with good approximation in a wavelength bandwidth of about 20 nm (e.g., in a wavelength band of 1.54 to 1.56 $\mu$m). While the above embodiments of the present invention adopt a definition by wavelength according to convention, the word of "wavelength" can be fully replaced by the word of "frequency", as understood from the above description.

Various weighting functions are described herein, for weighting by a weighting element. However, many different weighting functions can be used, and the present invention is not intended to be limited to the specific weighting functions disclosed herein.

In the above embodiments of the present invention, a gain tilt control unit operates to determine a momental wavelength and to control a parameter in accordance with the determined momental wavelength. Therefore, in FIG. 16, for example, monitoring unit 62 and control unit 64 together form a gain tilt control unit.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An optical communication system comprising:

an optical transmission line through which a wavelength division multiplexed (WDM) signal light travels in a propagation direction; and a plurality of optical amplifiers sequentially arranged along the optical transmission line in the propagation direction, each optical amplifier including an amplifier unit which receives the WDM signal light from the optical transmission line as the WDM signal light travels along the optical transmission line to the respective optical amplifier, amplifies the received WDM signal light, and outputs the amplified WDM signal light to the optical transmission line so that the amplified WDM signal light travels along the optical transmission line in the propagation direction is from the amplifier unit, the amplifier unit having a gain tilt and a parameter which is controllable to change the gain tilt, and a gain tilt control unit which determines a momental wavelength of the spectrum of the amplified WDM signal light output from the amplifier unit, and controls the gain tilt parameter in accordance with the determined momental wavelength to control the gain tilt of the amplifier unit.

2. An optical communication system as in claim 1, wherein:

the plurality of optical amplifiers include N optical amplifiers sequentially arranged along the optical transmission line in the propagation direction from a first through the Nth optical amplifier, in each optical amplifier, the gain tilt control unit controls the gain tilt of the associated amplifier unit to set the momental wavelength to a target value, and for the second through the Nth optical amplifiers, the target value is different from the target value of the preceding optical amplifier.

3. An optical communication system as in claim 2, further comprising a transmitting station which transmits the WDM signal light onto the optical transmission line, each of the N optical amplifiers being downstream of the transmitting station along the optical transmission line, wherein the target value of each respective optical amplifier is set to be $\lambda_0 - N\Delta\lambda$, where $\lambda_0$ indicates a momental wavelength target value of the spectrum of the WDM signal light as transmitted by the transmitting station and before travelling to the first optical amplifier, and $\Delta\lambda$ represents a shift amount.

4. An optical communication system as in claim 1, wherein:

the plurality of optical amplifiers include N optical amplifiers sequentially arranged along the optical transmission line in the propagation direction from a first through the Nth optical amplifier, in each optical amplifier, the gain tilt control unit controls the gain tilt of the associated amplifier unit to set the momental wavelength to a target value which is different from the target value set in each of the other optical amplifiers.

5. An optical communication system as in claim 1, further comprising:

means for transmitting information along the optical transmission line to each of the optical amplifiers, so that each optical amplifier can use the transmitted information to control the gain tilt of the associated amplifier unit.

6. An optical communication system as in claims 2, further comprising:

a transmitting station which transmits the WDM signal light onto the optical transmission line, each of the N optical amplifiers being downstream of the transmitting station along the optical transmission line; and means for transmitting information from the transmitting station to each of the optical amplifiers, so that each optical amplifier can use the transmitted information to control the gain tilt of the associated amplifier unit.

7. An optical communication system as in claim 6, wherein the transmitted information includes a momental wavelength target value of the spectrum of the WDM signal light as transmitted by the transmitting station and before travelling to the first optical amplifier.

8. An optical communication system as in claim 5, wherein the WDM signal includes a plurality of channels, and the transmitted information indicates the wavelength of each channel and data for identifying channels which are being used.

9. An optical communication system comprising:

an optical transmission line through which a wavelength division multiplexed (WDM) signal light travels in a propagation direction; and an optical amplifier including an amplifier unit which receives the WDM signal light from the optical transmission line, amplifies the received WDM signal light, and outputs the amplified WDM signal light to the optical transmission line so that the amplified WDM signal light travels along the optical transmission line in the propagation direction from the amplifier unit, the amplifier unit having a gain tilt and a parameter which is controllable to change the gain tilt, and a gain tilt control unit which determines a momental wavelength of the spectrum of the amplified WDM signal light, and controls the gain tilt parameter in accordance with the determined momental wavelength to control the gain tilt.

10. An optical communication system as in claim 9, further comprising:

means for transmitting information along the optical transmission line to the optical amplifier, so that the optical amplifier can use the transmitted information to control the gain tilt.

11. An optical communication system as in claim 9, further comprising:

a transmitting station which transmits the WDM signal light onto the optical transmission line, the optical amplifier being downstream of the transmitting station along the optical transmission line; and means for transmitting information from the transmitting station to the optical amplifier, so that the optical amplifier can use the transmitted information to control the gain tilt.

12. An optical communication system as in claim 9, wherein the amplifier unit of the optical amplifier comprises:

an optical amplifying medium through which the received WDM signal light propagates; and a light source which provides pump light to the optical amplifying medium so that the pump light amplifies the WDM signal light as the WDM signal light propagates through the optical amplifying medium, the parameter of the amplifier unit being the pump light provided by the light source, and the gain tilt control unit controlling the pump light to control the gain tilt.

13. An optical communication system as in claim 10, wherein the means for transmitting information comprises:
means for including a tone component in the WDM signal light, the tone component including the information.

14. An optical communication system as in claim 11, wherein the means for transmitting information comprises:
means for including a tone component in the WDM signal light, the tone component including the information.

15. An optical communication system as in claim 12, wherein the gain tilt control unit controls the pump light of the light source to maintain the momental wavelength at a center wavelength of the spectrum of the amplified WDM signal light.

16. An optical communication system as in claim 9, wherein the gain tilt control unit of the optical amplifier comprises:
a decoupling unit which decouples a portion of the amplified WDM signal light, to provide a first signal representing the amplified WDM light with the portion decoupled therefrom, and a second signal representing the decoupled portion;
a weighting unit which weights the second signal; and
a computation unit which determines the momental wavelength from the power of the first signal and the power of the weighted second signal.

17. An optical communication system as in claim 16, wherein the weighting unit of the gain tilt control unit of the optical amplifier weights the second signal with a weighting function which is a linear function with respect to wavelength of the WDM signal.

18. An optical communication system as in claim 16, wherein the computation unit of the gain tilt control unit of the optical amplifier determines the momental wavelength $\lambda_{cg}$ in accordance with the following equation:

$$\lambda_{cg} = \int \lambda P(\lambda) d\lambda / \int P(\lambda) d\lambda$$

where $P(\lambda)$ represents the spectrum of the WDM signal light.

19. An optical communication system as in claim 9, wherein the momental wavelength determined for the spectrum of the amplified WDM signal light is defined as a first momental wavelength, and the gain tilt control unit comprises:
a monitoring device which decouples a portion of the WDM signal light before the WDM signal light is amplified by the optical amplifier, and determines a momental wavelength of the spectrum of the WDM signal light from the decoupled portion and defined as a second momental wavelength, and
the gain tilt control unit controls the gain tilt parameter of the amplifier unit in accordance with the first and second momental wavelengths.

20. An optical communication system as in claim 19, wherein the gain tilt control unit controls the gain tilt parameter of the amplifier unit so that the first and second momental wavelengths are maintained to be substantially equal.

21. An optical communication system as in claim 9, wherein the WDM signal includes a pilot light having a tone component modulated thereon, the momental wavelength determined for the spectrum of the amplified WDM signal light is defined as a first momental wavelength, and the gain tilt control unit comprises:
a monitoring device which decouples the pilot light from the WDM signal light before the WDM signal light is amplified by the optical amplifier, and determines a momental wavelength of the spectrum of the WDM signal light from the decoupled pilot light and defined as a second momental wavelength, and
the gain tilt control unit controls the gain tilt parameter of the amplifier unit in accordance with the first and second momental wavelengths.

22. An optical communication system as in claim 21, wherein the monitoring device includes:
a decoupling unit which decouples the pilot light from the WDM signal light before the WDM signal light is amplified by the optical amplifier;
a weighting unit which branches the decoupled pilot light into a first branched signal and a second branched signal, weights the first branched signal in accordance with a weighting function $T(\lambda)$, and weights the second branched signal in accordance with a weighting function $R(\lambda)$, where $R(\lambda)=1-T(\lambda)$; and
a computation unit which determines the second momental wavelength from the power of the weighted first and second branched signals.

23. An optical communication system as in claim 22, wherein the gain tilt control unit further comprises:
means for maintaining a constant ratio of the amplitude of the weighted first branched signal to the amplitude of the weighted second branched signal.

24. An optical communication system as in claim 22, wherein the means for maintaining controls the temperature of the weighting unit to maintain a constant ratio of the amplitude of the weighted first branched signal to the amplitude of the weighted second branched signal.

* * * * *

UNITED STATES PATENT AND TRADEMARK OFFICE
CERTIFICATE OF CORRECTION

PATENT NO.  : 5,909,305
DATED       : June 1, 1999
INVENTOR(S) : Susumu KINOSHITA It is certified that error appears in the above-identified patent and that said Letters Patent is hereby corrected as shown below:

Title page, item [56],
[REFERENCES CITED]
Please add   --A Remote Supervisory System Based on Subcarrier Overmodulation for Submarine Optical Amplifier Systems--.

Col. 21, line 22, delete "is".

Signed and Sealed this

Sixteenth Day of November, 1999

Attest:

Q. TODD DICKINSON

*Attesting Officer*    *Acting Commissioner of Patents and Trademarks*